(12) United States Patent
Zimberoff et al.

(10) Patent No.: US 8,185,479 B2
(45) Date of Patent: May 22, 2012

(54) SHIPMENT PREPARATION USING NETWORK RESOURCE IDENTIFIERS IN PACKING LISTS

(75) Inventors: Rafael Zimberoff, Seattle, WA (US); Alexander Uslontsev, Seattle, WA (US); Stanislav Tugushev, Seattle, WA (US)

(73) Assignee: Z-Firm, LLC, Seattle, WA (US)

( * ) Notice: Subject to any disclaimer, the term of this patent is extended or adjusted under 35 U.S.C. 154(b) by 0 days.

(21) Appl. No.: 12/832,805

(22) Filed: Jul. 8, 2010

(65) Prior Publication Data
US 2010/0268659 A1    Oct. 21, 2010

Related U.S. Application Data

(63) Continuation-in-part of application No. 12/347,660, filed on Dec. 31, 2008, now Pat. No. 8,126,821, which is a continuation-in-part of application No. 12/169,509, filed on Jul. 8, 2008.

(60) Provisional application No. 61/019,208, filed on Jan. 4, 2008.

(51) Int. Cl.
*G06Q 30/00* (2012.01)
(52) U.S. Cl. ........................................................ 705/330
(58) Field of Classification Search .................. 705/330
See application file for complete search history.

(56) References Cited

U.S. PATENT DOCUMENTS

| | | | |
|---|---|---|---|
| 5,038,283 A | 8/1991 | Caveney | |
| 5,153,842 A | 10/1992 | Dlugos, Sr. et al. | |
| 5,804,803 A | 9/1998 | Cragun et al. | |
| 5,992,752 A | 11/1999 | Wilz, Sr. et al. | |
| 6,220,509 B1 | 4/2001 | Byford | |
| 6,539,360 B1 | 3/2003 | Kadaba | |
| 6,542,927 B2 | 4/2003 | Rhoads | |
| 6,827,273 B2 * | 12/2004 | Wilz et al. | 235/472.01 |
| 6,964,374 B1 | 11/2005 | Djuknic et al. | |
| 7,117,227 B2 | 10/2006 | Call | |
| 7,184,973 B2 * | 2/2007 | Monteleone et al. | 705/26.81 |

(Continued)

FOREIGN PATENT DOCUMENTS
AU    2007254694 B2    1/2008
(Continued)

OTHER PUBLICATIONS

Wikipedia, "URL Redirection," Nov. 28, 2006.*
(Continued)

*Primary Examiner* — Nathan Erb
(74) *Attorney, Agent, or Firm* — Lowe Graham Jones PLLC

(57) ABSTRACT

Example embodiments provide a Shipment Preparation System ("SPS"), which facilitates the preparation of shipments, such as by producing shipping labels. In one embodiment, the SPS is configured to receive shipment preparation information from a bar code or other machine-readable data block in a packing list. The shipment preparation information identifies a uniform resource identifier ("URI") that identifies a code module that is remote from the SPS. The SPS then communicates with the remote code module in order to obtain information for the preparation of the shipment and/or for transmission of information about the preparation of the shipment. Obtaining information for the preparation of the shipment may include receiving an address to use for printing a label. Transmitting information about the preparation of the shipment may include posting an indication that a label has been printed, a shipment is ready for pick up, or the like.

20 Claims, 14 Drawing Sheets

U.S. PATENT DOCUMENTS

| | | | |
|---|---|---|---|
| 7,225,400 B2 * | 5/2007 | Beezer et al. | 715/205 |
| 7,266,513 B2 * | 9/2007 | Chalmers et al. | 705/26.1 |
| 7,267,273 B2 | 9/2007 | Silverbrook et al. | |
| 7,409,353 B1 | 8/2008 | Uslontsev et al. | |
| 7,415,524 B2 | 8/2008 | Burd et al. | |
| 7,606,857 B2 | 10/2009 | Friedman et al. | |
| 7,620,583 B2 | 11/2009 | Sundel | |
| 7,624,025 B2 | 11/2009 | Uslontsev et al. | |
| 7,660,721 B2 | 2/2010 | Williams et al. | |
| 7,664,651 B1 | 2/2010 | Bennett et al. | |
| 7,918,402 B2 | 4/2011 | Conlon et al. | |
| 7,991,871 B2 | 8/2011 | Son et al. | |
| 2002/0010689 A1 * | 1/2002 | Tibbs et al. | 705/408 |
| 2002/0019759 A1 | 2/2002 | Arunapuram et al. | |
| 2002/0032573 A1 * | 3/2002 | Williams et al. | 705/1 |
| 2002/0038255 A1 * | 3/2002 | Tarvydas et al. | 705/26 |
| 2002/0158137 A1 | 10/2002 | Grey et al. | |
| 2002/0165931 A1 | 11/2002 | Greer et al. | |
| 2002/0193225 A1 * | 12/2002 | Raming | 493/375 |
| 2004/0177114 A1 * | 9/2004 | Friedman et al. | 709/203 |
| 2004/0215480 A1 * | 10/2004 | Kadaba | 705/1 |
| 2005/0133585 A1 | 6/2005 | Nakamura | |
| 2006/0168644 A1 | 7/2006 | Richter et al. | |
| 2006/0294196 A1 * | 12/2006 | Feirouz et al. | 709/217 |
| 2007/0192191 A1 * | 8/2007 | Neal et al. | 705/14 |
| 2008/0017722 A1 | 1/2008 | Snyder et al. | |
| 2008/0114782 A1 | 5/2008 | Sadovsky et al. | |
| 2008/0183326 A1 * | 7/2008 | Danelski | 700/215 |
| 2009/0146410 A1 | 6/2009 | Uslontsev et al. | |
| 2009/0177739 A1 | 7/2009 | Uslontsev et al. | |
| 2009/0234694 A1 | 9/2009 | Uslontsev et al. | |
| 2010/0185522 A1 | 7/2010 | Ouchi | |
| 2010/0268659 A1 | 10/2010 | Zimberoff et al. | |
| 2011/0082747 A1 | 4/2011 | Khan et al. | |

FOREIGN PATENT DOCUMENTS

| | | | |
|---|---|---|---|
| GB | 2460683 A | 12/2009 | |

OTHER PUBLICATIONS

Korpela, Jukka, "Re: NEWSGROUP Link tag, How to?" USENET post, alt.html, Jul. 10, 1998.*

ShipRush Product Documentation Excerpts, URL=http://www.zfirm.com/Product_Documentation/ShipRush/_v5-0_FedEX/,download date Dec. 4, 2007, 35 pages.

"FedEx Shipping Labels:—ShipRush for FedEx Shippers," URL=http://zfirm.com/products/shiprush_fedex.shtml, download date Dec. 6, 2007, 1 page.

* cited by examiner

ACME Music, Inc.
111 Somewhere St.
Brighton, MA 02135
United States
orders@acme.com Marketplace: Onlinemarket.com
Order Number: 00298
Ship Method: Standard
Customer Name: John Buyer
Order Date: 2/9/2010
Email: mrbuyer@emailsrv.com
Marketplace Order #: 104-901757-90345

To: Mr. John Buyer
123 Easy Street
Seattle, WA 98109
UNITED STATES

Items:

| Qty | Item | Locator | Condition | Price |
|---|---|---|---|---|
| 1 | Graceland – Music<br>Paul Simon<br>SKU: 560474  UPC: 0812278890421 | 2-SIMO | NEW | $9.39 |

Subtotal: $9.39
Shipping: $2.98
Total: $12.37

*Fig. 3B*

```
<shipblock>
    <shipment_info src="http://www.abc.com/getshipinfo?order_num=0298"/>
    <postback src="http://www.def.com/postinfo?order_num=0298&track_num=%TRACKING_NUM%"/>
</shipblock>
```

*Fig. 3C*

```
<shipblock src="http://www.abc.com/getshipblock?order_num=0298"></shipblock>
```

*Fig. 3D*

```
<shipblock>
    <order_number num=00298/>
    <shipto_address>
        <name>Mr. John Buyer</name>
        <street>123 Easy St.</street>
        <city>Seattle</city>
        <postal_code>98109</postal_code>
    </shipto_address>
    <from_address> ... </from_address>
    <contents>
        <item>Graceland CD – Paul Simon</item>
    </contents>
    <postback src="http://www.abc.com/postinfo?order_num=00298&track_num=%TRACKING_NUM%"/>
</shipblock>
```

*Fig. 3E*

SHIPMENT PREPARATION USING NETWORK RESOURCE IDENTIFIERS IN PACKING LISTS

TECHNICAL FIELD

The present disclosure relates to methods, systems, and techniques for smart packing lists and, in particular, to methods and systems for preparing shipments based on information stored in a machine-readable data block, such as a bar code, in a packing list.

BACKGROUND

A number of approaches exist for performing operations related to shipment preparation, such as printing shipping labels using a computer. In one approach, a shipping label is prepared and printed using a stand-alone application executing on a shipper's computing system. Such client-side applications may include document preparation applications, such as word processors or special-purpose shipping label applications. Using a word processor to prepare shipping labels may be an error prone process, as relevant information (e.g., each destination shipping address) may need to be entered manually. In addition, the word processor may not be configured or otherwise capable of preparing bar codes or other machine-readable indicia required or preferred by some carrier services.

Special-purpose shipping label applications also suffer from a number of drawbacks. In particular, they are typically limited in their ability to communicate over a network to obtain information relevant to a shipping label (e.g., a recipient address), or to inform other computing systems about a shipping label that has been printed (e.g., for tracking purposes). Furthermore, even if a stand-alone shipping label application has network capabilities, information is exchanged in a potentially non-uniform manner between shipping label applications and remote computing systems. In such cases, the developers of shipping label applications may need to implement multiple diverse mechanisms for communicating with different remote computing systems, such as those provided by different shipping carriers for tracking shipments. Further, some remote computing systems may be unable or unwilling to grant or support access by a special-purpose shipping label application (e.g., based on security concerns, technical considerations, etc.), resulting in reduced functionality for the special-purpose shipping label application.

In other approaches, Web-based shipping label applications have been used. Such applications allow a user to utilize a Web browser to prepare and print shipping labels. Web-based shipping label applications may not be able to readily or conveniently access information stored in locations other than those that are accessible to the Web server that provides the shipping label application (e.g., the client machine, computing systems operated by third-parties, etc.). For example, because the shipping label application is a server side application, it may not be able to interact with software (e.g., database systems, address books, etc.) and/or hardware (e.g., printers, disks, etc.) resident on the client machine or on Internet-connected systems. Such restrictions may result in reduced functionality for the shipping label application, such as poor integration, low quality shipping label output, etc.

Furthermore, many shipping label applications and other shipping systems are tightly coupled to one or more other systems. For example, some shipping label applications are tightly coupled to a particular carrier, such that they can generate labels and perform other operations that are tailored for that particular carrier, but not for other carriers. In other cases, a shipping system may be tightly coupled to a particular e-commerce platform, such that the shipping system can be used to process orders received via that particular e-commerce platform, but not other sources.

BRIEF DESCRIPTION OF THE DRAWINGS

FIGS. 3A-3H are example screen displays and shipment preparation information blocks illustrating the generation of an example shipping label via an example shipment preparation process.

DETAILED DESCRIPTION

Figure 1A:
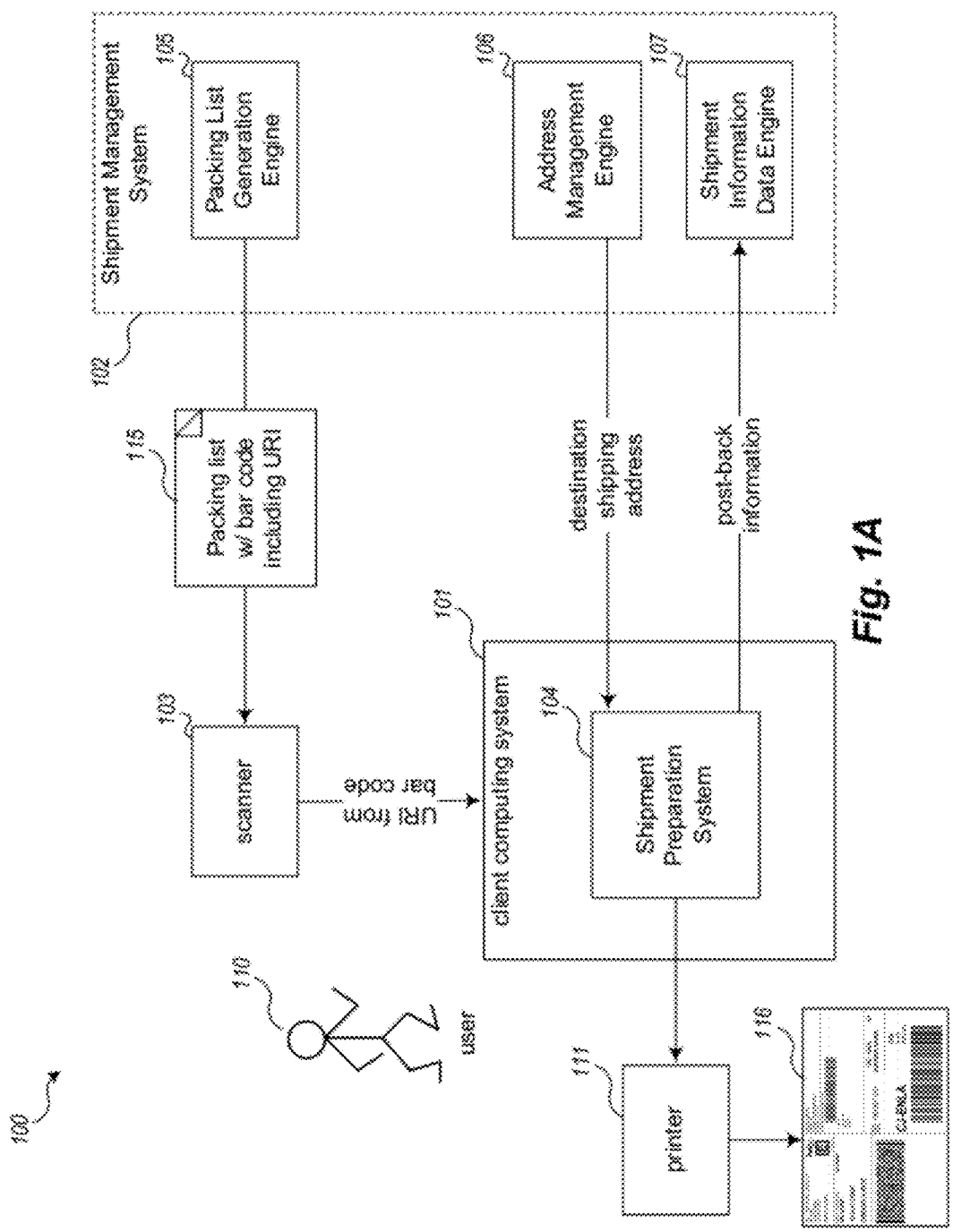
FIGS. 1A and 1B are example block diagrams of components of example environments for preparing shipments using a shipment preparation system.

Embodiments described herein provide enhanced computer- and network-based methods, techniques, and systems for preparing item shipments, such as by producing shipping labels. Example embodiments provide a Shipment Management System ("SMS"), which may interact with one or more Shipment Preparation Systems ("SPS"), in order to enable users to efficiently prepare item shipments by producing shipping labels, producing pick lists, recording and/or transmitting information about shipments, or the like. An item shipment (i.e., a shipment) includes one or more activities related to the transport of an item from one location to another. Such activities may include obtaining and/or providing information about a shipment (e.g., a destination shipping address, a parcel weight and/or size, a tracking number, etc.), outputting a shipping label for the shipment (e.g., an address label, postage indicia, etc.), delivery and/or receipt of the shipment, etc. Items may include any objects that may be transported by a shipping carrier network (e.g., the U.S. Postal Service, Federal Express, a shipping agency, etc.), such as goods (e.g., items purchased by customers), packages, communications (e.g., letters, documents, magazines, flyers, etc.), etc. Preparing an item shipment includes any item shipment tasks or activities that are performed prior to the dispatch of the shipment, for example prior to tendering the shipment to a carrier. For example, preparing an item shipment may include preparing a packing list, preparing a pick list, producing a shipping label, selecting shipment items, packaging items, affixing one or more labels to a package, and the like.

In some embodiments, a packing list having a machine-readable data block, such as a bar code (or "barcode") is used to facilitate preparation of item shipments (i.e., shipment preparation). A packing list may be any document (e.g., electronic, hard copy, etc.), packing material (e.g., box, mailer, envelop, wrapper), or other object that in some way identifies and/or describes a particular item shipment, such as by including or otherwise identifying source and destination address details, items for the shipment, shipment preferences, or the like. In some embodiments, the machine-readable data block in the packing list contains shipment preparation information that is configured to cause an SPS to perform various actions related to shipment preparation, such as label printing. In one embodiment, the machine-readable data block includes one or more uniform resource identifiers ("URIs") that are used by the SPS to communicate with one or more remote code modules, such as the SMS, to obtain information for the preparation of a shipment (e.g., a destination shipping address to use for a label, items in the shipment) and/or to transmit information about the shipment (e.g., a parcel weight, a tracking number). Note that the packing list need not identify itself with any particular name or title (e.g., "Packing List"). Nor does the packing list need to contain any human-readable information. In some cases, the packing list may include only the machine-readable data block.

Figure 1B:
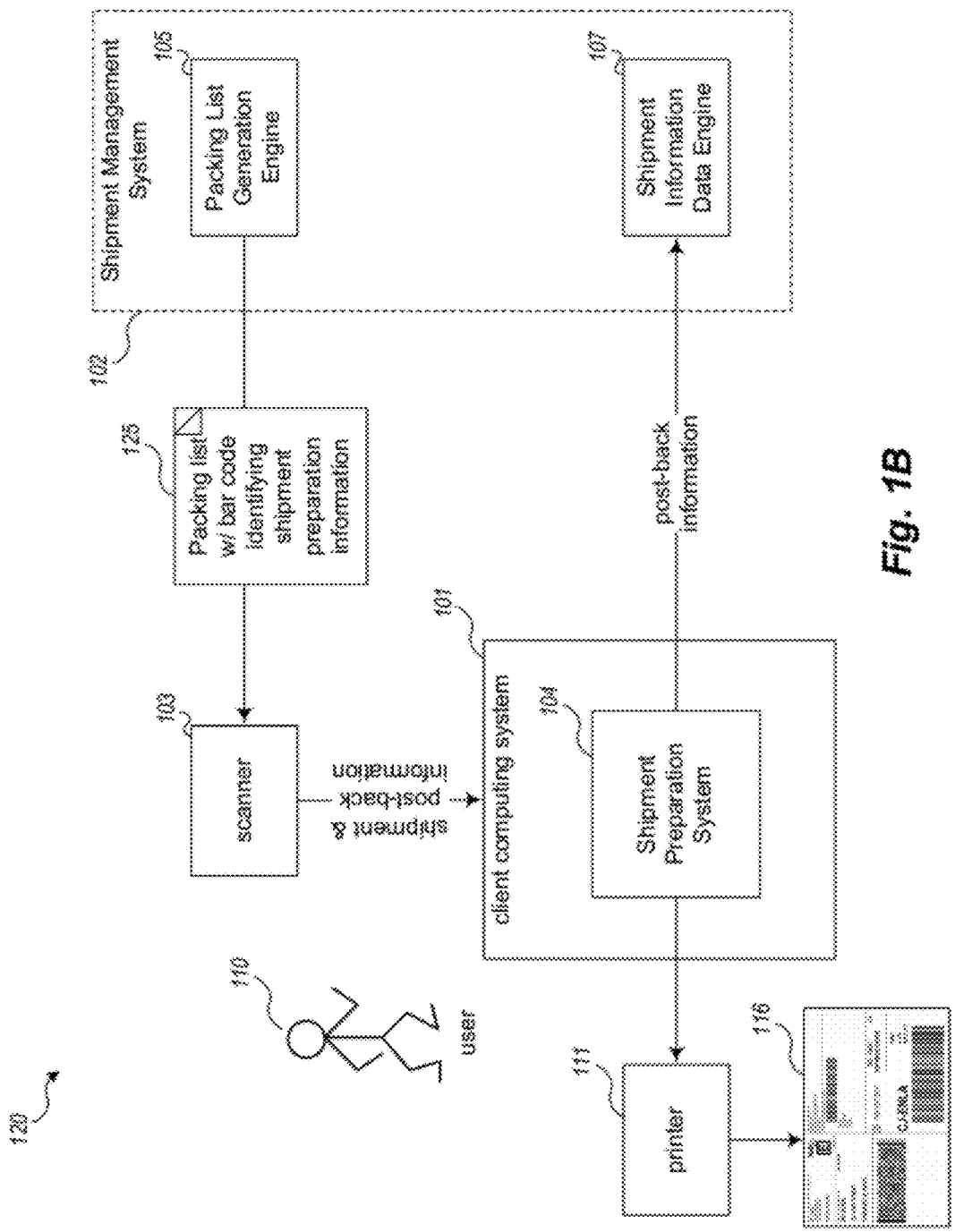

FIGS. 1A and 1B are example block diagrams of components of example environments for preparing shipments using a shipment preparation system. In particular, FIG. 1A is an example block diagram of components of an example shipment preparation environment according to a first example embodiment. More specifically, FIG. 1A depicts the production of a shipping label by a user 110 in the context of an example Shipment Preparation Environment ("SPE") 100. In the illustrated embodiment, the SPE 100 includes a client computing system 101, a Shipment Management System ("SMS") 102, a scanner 103, and a printer 111. The client computing system 101 includes a Shipment Preparation System ("SPS") 104.

The example SMS 102 includes a packing list generation engine 105, an address management engine 106, and a shipment information data engine/repository 107. The components of the SMS 102 provide various functions and/or services related to the management of shipments, such as supporting (e.g., facilitating) the preparation of shipments by generating and providing packing lists that include bar codes or other machine-readable data blocks that include shipment preparation information that can be used to produce shipping labels or perform other tasks associated with the preparation of shipments. In one embodiment, the packing list generation engine 105, manages the generation and provisioning (e.g., transmitting, forwarding, sending, etc.) of packing lists that may be used to initiate, cause, invoke, or otherwise perform shipments. The address management engine 106 provides destination shipping addresses and/or other information regarding shipments in response to requests received from the SPS 104 and/or other systems/components. The shipment information data engine 107 records (e.g., stores, tracks, etc.) information about shipments, such as when a label was printed, when a shipment was sent, tracking number(s), and/or other details related to a particular shipment. The shipment information data engine 107 may provide additional services related to shipments, such as providing tracking capabilities to third parties (e.g., item recipients).

Note that although the packing list generation engine 105, the address management engine 106, and the shipment information data engine 107 are illustrated as part of the shipment management system 102, no restrictions are placed on the location and/or control of components 105-107. In particular, in one embodiment, the shipment management system 102 may be deployed as part of a single Web server having software modules (e.g., CGI modules, servlets, server-side code modules, plug-ins, etc.) corresponding to each of components 105-107. In another embodiment, components 105-107 may be operated under the control of different entities and/or on different computing systems. For example, the packing list generation engine 105 may be part of a first Web site that provides an order management facility, the address management engine 106 may be an electronic address book situated on the client computing system 101, and the shipment information data engine 107 may be part of a second Web site that provides an interface to one or more shipping carrier services (e.g., United Parcel Service, U.S. Postal Service, etc.). In some embodiments, all or some of the SMS 102 is operated by a shipping carrier, whilst the SPS is operated by an entity (e.g., a merchant) that is not the shipping carrier and that utilizes the shipping carrier to transport shipments to their destinations. In some embodiments, all or some of the SMS 102 are operated by some third party, such as an ecommerce platform (e.g., eBay, Amazon.com, Volusion), or the SMS 102 is an ecommerce system operated by or on behalf of the user 110. In addition, different and/or additional components may be provided as part of an SMS 102.

In the illustrated example, a user 110 operates the client computing system 101 to prepare one or more shipments. In particular, the user 110 receives a packing list 115 that has been generated by the packing list generation engine 105. Receiving the packing list may include receiving a printed (e.g., hard copy) version of the packing list and/or receiving an electronic version (e.g., a PDF file, Word document, etc.) of the packing list. The packing list includes a machine readable-data block, such as a bar code, that contains/includes shipment preparation information including a URI (or other identifier) that identifies a code module or other network resource (e.g., a file) that is remote and separate from the client computing system 101 (and the SPS 104). The user operates the scanner 103 to obtain the shipment preparation information (including the URI) by reading the bar code in the packing list 115. When the packing list 115 has been obtained in electronic form, the user 110 may in some embodiments simply point the scanner 103 at a display or device (e.g., tablet computer, smart phone, etc.) that is used to present or otherwise display the packing list 115. The URI is then obtained from the received shipment preparation information by the SPS 104.

Upon receiving the URI, the SPS 104 uses the URI to access the address management engine 106 and obtain a destination shipping address associated with the URI. Then, the SPS 104 generates a shipping label 116 that includes the destination shipping address and prints the shipping label 116 via the printer 111. The SPS also uses the URI (or another URI that is included in or identified by the shipment preparation information) to post information about the preparation of the order to the shipment information data engine 107. For example, upon printing or otherwise outputting the shipping label, the SPS 104 posts information about the printed label to the shipment information data engine/repository 107. Posting information to the shipment information data engine/repository 107 may include providing, sending, transmitting, forwarding information using any protocol or other communication mechanism, such as HTTP, HTTPS, FTP, SMTP, SOAP, etc. The posted information may include, for example, the fact that the label has been printed along with other details related to the shipment, such as package weight, tracking numbers(s), estimated transit time, temperature or other environmental measurements at time of shipment, etc. Other users (e.g., shipment recipients) of the shipment management system 102 or via other permitted systems may then access information about the status of the shipment.

FIG. 1B is an example block diagram of components of an example shipment preparation environment according to a second example embodiment. FIG. 1B illustrates an environment 120 that differs from environment 100 described with respect to FIG. 1A. In particular, the shipment preparation information in the packing list 125 is somewhat different than the shipment preparation information in the packing list 115 of FIG. 1A, as will be discussed below. In addition, the SMS 102 does not include an address management engine 105.

In FIG. 1B, the packing list 125 has a bar code that identifies shipment preparation information. Identifying shipment preparation information may include containing or including a URI or other identifier of a network resource that is capable of providing the shipment preparation information, such as addresses or post-back locations, as discussed with respect to FIG. 1A. However, identifying shipment preparation information may also include containing the shipment preparation information directly, such as by literally including indications of a destination shipping address, order items, or the like, in a bar code or other machine-readable data block. In the present example, the bar code of the packing list 125 includes all information that is needed by the SPS 104 to generate and print a shipping label. Accordingly, in the illustrated embodiment, there is no need for an address management engine 105 illustrated as part of the SMS 102, because any shipping label generation information needed by the SPS 104 can be obtained directly from the bar code in the packing list 125. Thus, the SPS 104 can output a shipping label that includes only information received from the bar code in the packing list and without communicating with a remote code module to obtain information for the shipping label.

In addition, the bar code of the packing list 125 further identifies a URI (e.g., a post-back URI) or other identifier that can be used to transmit information about the preparation of the shipment, as discussed with respect to FIG. 1A. Identifying a URI may include incorporating the URI directly, or identifying some other component (e.g., file, program module, system) that can provide the URI. Having obtained the URI, the SPS 104 uses the URI to transmit information about the preparation of the shipment, such as a package weight, tracking code, or the like, to the shipment information data engine 107.

Figure 2:
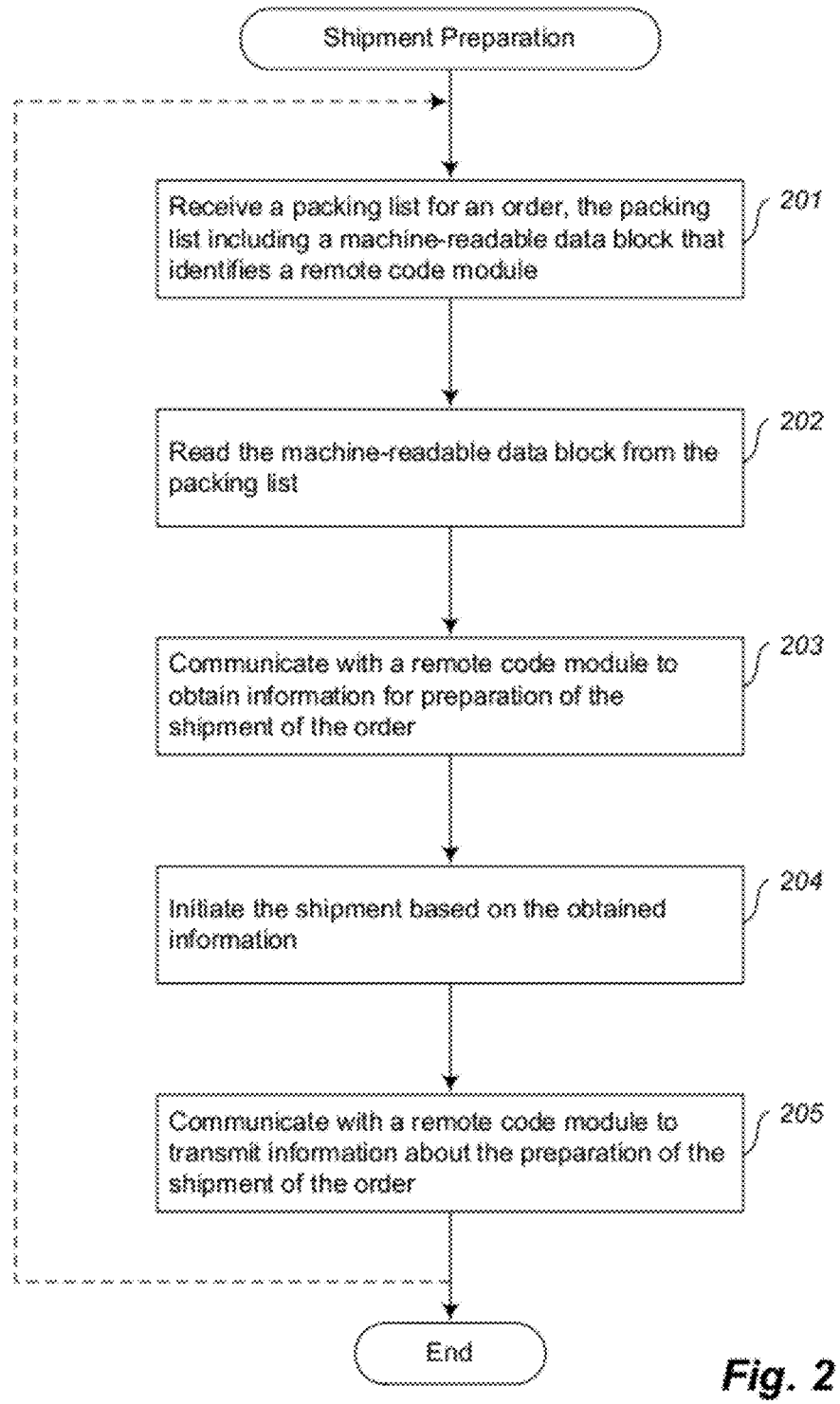
FIG. 2 is an example block diagram of an overview of an example shipment preparation process.

FIG. 2 is an example block diagram of an overview of an example shipment preparation process. The illustrated process may be performed by one or more components and/or users of the SPE 100, described with reference to FIGS. 1A and 1B, to prepare a shipment. In particular, the illustrated process facilitates preparation of a shipment by an SPS, based on information included in a machine-readable data block in a packing list.

More specifically, in block 201a packing list for an order is received, the packing list including a machine-readable data block that identifies a remote code module. An example packing list is described with reference to FIG. 3B, below. The machine-readable data block may be implemented by, in, or as a one- or two-dimensional bar code (e.g., 2D code, matrix code), an RFID ("Radio Frequency Identification") tag, or other machine-readable data carrier. The remote code module may be identified in various ways, including by a URI, network address, hostname, or the like, that is encoded upon or within the machine-readable data block. The identified code module provides information for the preparation of the shipment and/or receives information about the preparation of the shipment. Example URIs and data formats for identifying a remote code module are described with reference to FIGS. 3C-3E, below.

In block 202, the SPS reads the machine-readable data block from the packing list. Reading the machine-readable data block may include scanning a bar code (e.g., with an optical scanner), interrogating an RFID tag (e.g., with an RFID interrogator), or the like. Data contained in the machine-readable data block is then transmitted to and received by the SPS, where it is utilized to facilitate preparation of the shipment, as described next.

In block 203, the SPS communicates with a remote code module (e.g., the remote code module identified by the machine-readable data block) to obtain information for the preparation of the shipment of the order. The obtained information may include an indication of at least one of: a destination shipping address; an order number; information about one or more items in the order, including at least one of a quantity, a part number, a stock-keeping unit, a color, a size, a weight, and/or a price; a preferred shipping method; a package type; a package size; and/or a shipping carrier. As will be described further below, in some embodiments the SPS may obtain the information without reference to a remote code module, such as when the machine-readable data block includes all of the necessary shipment information.

In block 204, the SPS initiates the shipment based on the obtained information, such as by initiating output of a shipping label. An example shipping label is described with reference to FIG. 3G, below. Initiating output of a shipping label may include printing (e.g., to a laser printer, thermal printer, label printer), presenting (e.g., displaying), communicating (e.g., sending, transmitting, etc.), or otherwise forwarding/transmitting the shipping label. Initiating output of the label may also include generating a shipping label, such as by creating, updating, or otherwise managing data structures and/or indicators of information about a particular shipment, such as may be stored by a data repository such as a database or file system.

In some embodiments, generating the shipping label may include determining a destination shipping address, such as by direct reference to information contained within the machine-readable data block (e.g., when the machine-readable data block encodes the address). In other embodiments, the destination shipping address may be determined by interacting with an identified code module (e.g., the address management engine 106 of FIG. 1A) to obtain the destination shipping address, or by any other technique for "discovering" an associated destination shipping address. For example, the shipment preparation information may include a URI that identifies a Web server configured to provide a destination shipping address in response to an order number or other identifier. Or, the shipment preparation information may reference a local or remote network-accessible file (e.g., on a file server or network share) that includes the destination shipping address and/or other information. Multiple levels of indirection are contemplated. For example, the shipment preparation information may identify a code module that is configured to provide a URI that references a code module configured to provide a destination shipping address.

In other embodiments, initiating the shipment may include other activities. For example, preparing the shipment may include causing a person to prepare a package by generating and transmitting a pick list or other instructions to the person that specify one or more items of the order to be retrieved or otherwise selected for packaging. In other embodiments, preparing the shipment may include providing an indication of packaging materials to be used.

In block 205, the SPS communicates with a remote code module to transmit information about the preparation of the shipment of the order. The remote code module may be a shipment information data engine 107 provided by a remote Web server, as described with reference to FIGS. 1A and 1B. Note that the code module referenced by block 203 could be different than the code module referenced by block 205. Communicating with the remote code module may include transmitting information about a produced shipping label, such as by notifying the code module that the shipping label has or has not been successfully produced. For example, when a printer communicatively coupled to the SPS successfully prints the shipping label, the SPS may notify the code module of that fact. In general, information about various aspects of the shipment preparation may be transmitted, including for example: a tracking number or other shipment identifier; a shipping method; a status of a label printing operation; details about a label printing operation, including at least one of a printer type, a printer name, a printer location, a media type, a data, and/or a time; a shipping carrier; parcel dimensions and/or weight; a packaging type; a shipment status including an indication of at least one of an order is ready to be processed, an order has been processed, the shipment being ready for pickup by the shipping carrier, the shipment not being ready for pickup by the shipping carrier, the shipment has been tendered to a shipping carrier, a vehicle type, and/or an amount of space needed in a vehicle; or the like.

In some embodiments, communicating with the remote code module may include determining or otherwise identifying the code module, such as by direct reference to the shipment information data engine (e.g., when the machine-readable data block encodes the address). In other embodiments, the remote code module may be determined by interacting with a code module, file, or data that is configured to provide the location/identification of the code module (e.g., the shipment information data engine 107 of FIG. 1A), or by any other technique for "discovering" a code module. For example, the machine-readable data block may include a URI that identifies a Web server configured to provide a file that contains information that can be used to obtain the location of the remote code module.

After block 205, the process ends, or optionally returns to block 201, such as when the SPS is operating in a batch mode where it processes multiple packing lists, or multiple machine-readable data blocks contained within one packing list.

FIGS. 3A-3H are example screen displays and shipment preparation information blocks illustrating the generation of an example shipping label via an example shipment preparation process. In particular, FIGS. 3A-3H illustrate a scenario in which a user operates a Web browser to obtain a packing list corresponding to an order, along with the corresponding production of a shipping label for the order via an SPS. In the example of FIGS. 3A-3H, the preparation of a shipment is described in the context of an online, electronic commerce application, such as an auction Web site. In particular, an SPS is used to print a shipping label that is to be used to send to a recipient an item ordered by a customer. This example is not intended to limit the described techniques to the production of shipping labels for items ordered in the context of electronic commerce transactions. In particular, the described techniques may be used to prepare shipments for other purposes, such as communication (e.g., sending a letter or other communication to a person or other entity), advertising (e.g., direct mail marketing), sales force automation, customer relationship management, and the like. The described techniques may also be used to facilitate other activities related to shipment preparation, such as the generation of pick lists, the production of packing instructions, and the like.

Figure 3A:
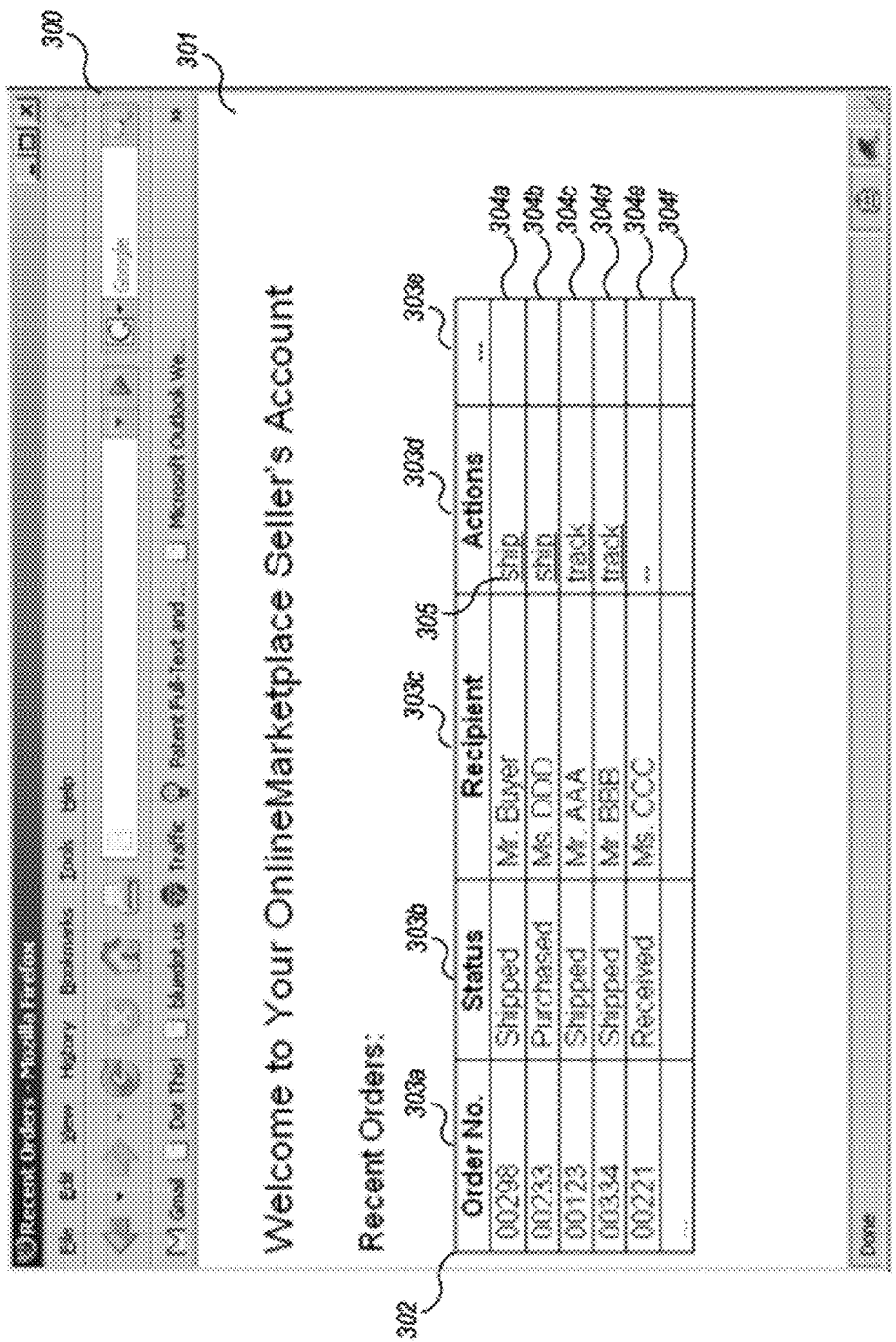

FIG. 3A depicts a Web browser displaying an example order management application provided by a Web server. In particular, the Web browser 300 is illustrated displaying an order management application 301 that may be used by, for example, a user or other entity that sells items to remote customers, such as via an online marketplace, an auction Web site, etc. When a customer purchases an item, it may be recorded as an order that is managed by the order management application 301. Managing orders may include querying, shipping, tracking, or otherwise administering the process of transferring possession of ordered items to recipients.

In the illustrated example, the order management application 301 displays a table 302 of recent orders that have been placed by various customers. The table is organized into rows 304*a*-304*f* that each represent one order. Each row includes fields 303*a*-303*e* that each contain information about one aspect of the associated order. In particular, each order includes an order number 303*a*, an order status 303*b*, a recipient 303*c*, and one or more actions 303*d*. The actions listed in field 303*d* may be presented as user-selectable controls (e.g., links, buttons, etc.), such that a user may invoke associated functionality to perform the action. Field 303*e* indicates that in other embodiments, orders may have a greater or lesser number of associated fields.

For example, fields (columns) 303*a*-303*d* of order (row) 304*a* indicate that the illustrated order has an order number of 00298, that the order has been purchased and is to be shipped to Mr. Buyer, and that the order may be shipped by selecting (e.g., clicking on) a link 305 named "ship" in field 303*d*. In the illustrated example, the user selects the link 305, and in response, the Web browser 300 presents a packing list, as described with respect to FIG. 3B, next.

FIG. 3B depicts an example packing list provided by the order management application 301 of FIG. 3A. In particular, FIG. 3B depicts a packing list 310 that includes a bar code 311 and various human-readable information blocks 312, including a source address 312*a*, a destination address 312*b*, and an item list 312*c*. In other embodiments, a packing list need not include any of the human-readable information 312. For example, a packing list could just be a piece of paper or electronic display that includes one or more bar codes. Compatibility with various types of bar code formats/symbologies is contemplated, including various kinds of one-dimensional bar codes, including Code variants (e.g., Code 39, Code 93, Code 128), UCC/EAN-128, and the like; and two-dimensional or matrix bar codes, including MaxiCode, QR Code, PDF417, Aztec Code, Datamatrix, and the like.

FIGS. 3C-3E depict example information stored in a machine-readable data block of a packing list. More particularly, FIGS. 3C-3E each illustrate different example shipment preparation information blocks that are formatted in an XML-like format. Other formats are contemplated, including binary formats, character-delimited formats, encrypted formats, compressed formats, and the like. The SPS is configured to generate a shipping label and perform other shipment preparation tasks based on the information included in shipment preparation information blocks received from machine-readable data blocks in packing lists.

FIG. 3C depicts a first example shipment preparation information block 315. The block 315 includes a shipment information URI 316 (included in a shipment_info XML element) and a post-back URI 317 (included in a postback XML element). The shipment information URI 316 identifies a code module, such as the address management engine 106 (FIG. 1A) here as "www. www.abc.com/getshipinfo," that is configured to provide shipment information including a destination address, order items, and the like, in response to a received address identifier. In the illustrated example, the URI 316 includes an order identifier ("00298") that corresponds to the order number of field 303*a* of order 304*a* of FIG. 3A. The SPS may utilize the URI 316 to obtain, for example via HTTP ("HyperText Transport Protocol") or other protocol (e.g., FTP) specified by the URI 316, a destination shipping address corresponding to or otherwise associated with order number 00298. The obtained destination shipping address may then be used to generate a corresponding shipping label for the associated order. In other embodiments, the URI 316 may be used to obtain other kinds of information about a pending shipment. For example, the SPS may utilize the URI 316 to verify the correctness of a destination shipping address, to obtain an identity of a shipping carrier, to obtain indications of order items, and the like.

The post-back URI 317 is used by the SPS to provide information about the shipment preparation to a code module, such as the shipment information data engine 107 (FIG. 1A) here as "www.def.com/postinfo," that is configured to track or otherwise record information about shipments that have been prepared by the SPS. In the illustrated example, the URI 317 includes the same order identifier (00298) described with respect to URI 316. The SPS may utilize the URI 317 to provide, for example via HTTP, information about shipment preparation to the shipment information data engine. For example, it may provide an indication that the shipment corresponding to order 00298 has been shipped, an indication that a shipping label for the order has been produced, and the like.

FIG. 3D shows a second example shipment preparation information block 320. The block 320 includes as shipment preparation information only a single URI 321 that may be used by the SPS to obtain further shipment preparation information, such as shipment information and/or post-back information. For example, the SPS may access the code module identified by the URI 321 to obtain a shipment information URI and a post-back URI, as described with reference to FIG. 3C, above. In another embodiment, the SPS may access the code module identified by the URI 321 to directly obtain shipment information (e.g., order details, addresses) and/or to transmit information about preparation of the shipment.

FIG. 3E shows a third example shipment preparation information block 325. The block 325 includes shipment information 326 and a post-back URI 327 (included in a postback XML element). The shipment information 326 directly specifies the shipment information related to order 00298 described with respect to FIG. 3A. In particular, shipment information 326 includes indicators of an order number in the order_number XML element, a destination address in the shipto_address XML element, a source address in the from_address XML element, and order items in the contents XML element. Some details have been here omitted for presentation clarity, such as the source address, as specified by ellipses (" . . . ").

In some embodiments, post-back information may include indications (such as string parameters) of one or more data items that are to be provided by the SPS to the shipment information data engine. In the illustrated example of FIG. 3E, the post-back URI 327 includes an indication that the SPS is to provide a tracking number associated with the shipment and/or shipping label. In this example, data items that are to be provided by the SPS are specified as field names surrounded by "%" characters (e.g., "% TRACKING_NUM %"). When the SPS processes the URI 327, prior to interacting with the shipment information data engine, the SPS replaces indicated fields with corresponding data items that are associated with the shipment. Additional data items that may be specified are described with reference to Table 3, below.

Other variations besides those illustrated in FIGS. 3C-3E are contemplated. For example, some shipment preparation information blocks may include information that is sufficient for the SPS to perform all of its functions without interacting with any remote code modules. In such an embodiment, the SPS operates in "local" mode, and does not communicate with a remote code module to obtain information for the preparation of the shipment or to transmit information about the preparation of the shipment. In another embodiment, the information that is here described as being part of a single shipment preparation information block and/or described as being contained in a single machine-readable data block may be disaggregated over two or more blocks. For example, a first bar code may include shipment information (e.g., destination shipping address, shipment information URI) while a second bar code may include post-back information (e.g., an identifier of a post-back URI). As another example, a single packing list may include multiple bar codes that include shipment information for distinct orders, and a single bar code that includes post-back information that is to be used to transmit post-back information for each of the distinct orders described by the multiple bar codes.

Figure 3F:
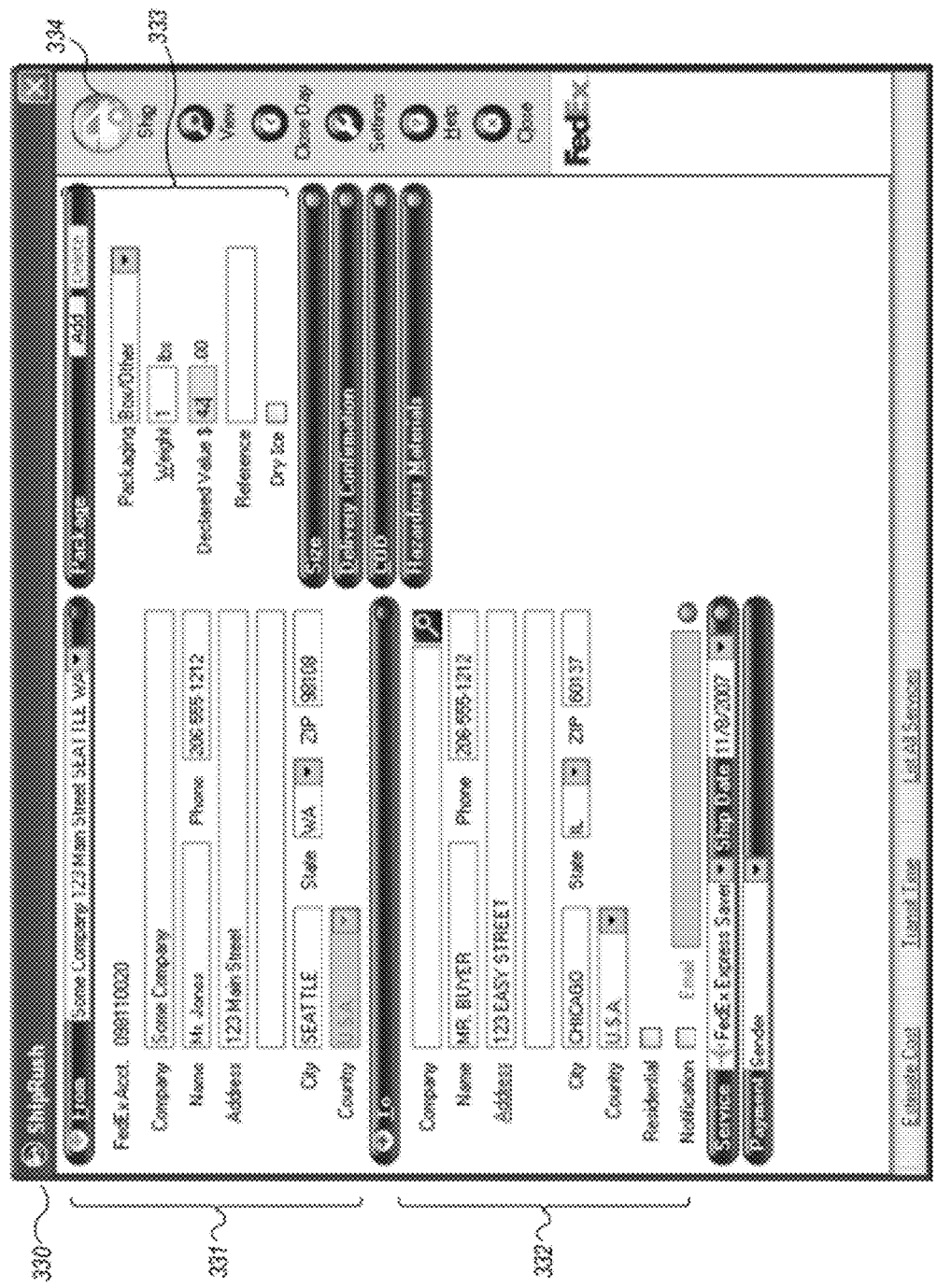

FIG. 3F depicts a user interface of an example shipment preparation system. The illustrated SPS 330 may be an interactive desktop application, which may be executing on, for example, a client computing system situated in a warehouse or other shipping facility. In other embodiments, the SPS 330 may be a Web-based or otherwise networked shipping application. For example, the illustrated SPS 330 may be implemented as one or more network-accessible resources (e.g., HTML pages, client side scripts, active components, browser plugins or extensions) hosted by a shipping carrier or other entity that, when loaded in a client Web browser, render into an interactive application that can be used to prepare shipments. For example, the SPS 330 may be a hybrid system that executes partly on a client computing system and partly on one or more server computing systems, possibly including Web servers, API servers, and/or application servers. The SPS 330 may execute in cooperation with a scanner or other input device to read shipment preparation information, such as that described with respect to FIGS. 3C-3E, above.

The SPS 330 includes user-selectable controls (e.g., text fields, drop down menus, checkboxes, etc.) for specifying various information related to a particular shipment, such as sender information 331, recipient information 332, and package information 333. The SPS 330 may automatically populate at least some of the controls based on shipment preparation information received from a bar code or other machine-readable data block. In one example embodiment, based on a shipment information URI (e.g., URI 316) received by the SPS 330 as part of shipment preparation information (e.g., shipment preparation information 315), the SPS 330 requests a destination shipping address from an address management engine. Upon receiving the destination shipping address, the SPS 330 then populates (e.g., fills in) one or more of the fields of the recipient information 332. The SPS 330 may also automatically populate other fields, such as those in the sender information 331, such as based on previously recorded user preferences and/or settings. In the illustrated embodiment, the user of the SPS 330 may provide additional information about the shipment, such as parcel information 333 (e.g., shipping weight, value, etc.). In other embodiments, the SPS 330 has no user interface at all, and runs automatically in response to the receipt of the shipment information.

The SPS 330 also includes a ship control 334 that may be selected by a user to initiate the output of a shipping label corresponding to the specified shipment. In some embodiments, the output of the shipping label may be delayed until a later time, such as the end of a workday, so that multiple shipping labels may be output in a batch manner. After the user prints the label using the ship control 334, the SPS 330 may transmit information about the label or the shipment (e.g., package weight, tracking number(s), environmental aspects of the shipping area, an indication that the shipment is ready for pickup) to a remote code module based on shipment preparation information received from a machine-readable data block in a packing list.

Figure 3G:

FIG. 3G depicts an example shipping label produced by an example shipment preparation system. The shipping label 340 includes a sender information portion 341, and a recipient information portion 342. The recipient information portion 342 includes text corresponding to the recipient information 332 described with respect to FIG. 3F. The label 340 includes various other elements, including machine-readable data blocks such as bar code 343. The bar code 343 may include information such as tracking numbers that are used for purposes such as package routing and/or tracking. In some embodiments, the bar code 343 may include recipient receipt scan information that may cause one or more actions to be performed upon a scan by a recipient client device (e.g., a smart phone). Recipient receipt scans are described in more detail below.

Figure 3H:
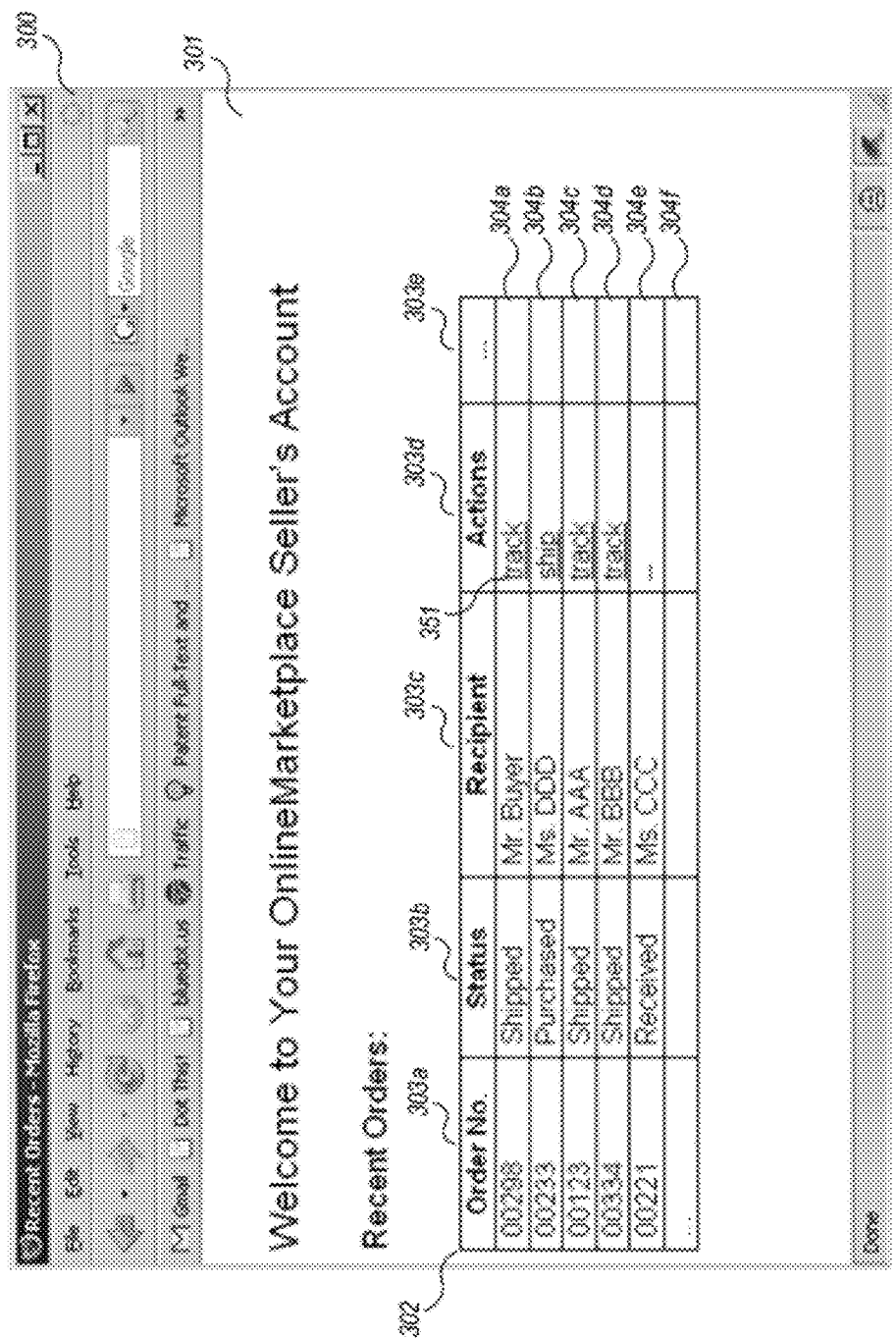

FIG. 3H depicts the user interface of an example order management application after the shipping label shown in FIG. 3G has been produced. The Web browser 300 is illustrated displaying the example order management application 301 described with reference to FIG. 3A. Here, the order management application 301 displays the table 302 in an updated state, after a shipping label for the order of row 304a has been produced, as described with reference to FIGS. 3A-3G, above. In particular, the "ship" link 305 shown in FIG. 3A has here been replaced with a "track" link 351, because the SPS has posted information about the shipment back to the order management application 301, such as the printing of the shipping label, a parcel tracking number, etc.

In the illustrated embodiment, the order management application 301 has been displayed in an updated state, for example, in response to a user request (e.g., a page reload) to a Web server that provides the order management application 301. However, in other embodiments, the Web server may automatically update or refresh the order management application 301, for example in response to a posting of information about the shipment received from the SPS.

In other embodiments, a flow that is different from the one described with respect to FIGS. 3A-3H may be employed. For example, in one embodiment at least some of the functions of the order management application of FIG. 3A may be integrated with those of the shipment preparation system of FIG. 3F. In particular, when the user selects the link 305, the Web browser may present both the packing list of FIG. 3B and the shipping label of FIG. 3G, either as a single document/page, or as multiple distinct documents/pages. The user can then print both the packing list and the shipping label (possibly in a single operation), without further interacting with an interactive user interface such as the one described with respect to FIG. 3F. When the user scans the bar code of the packing list, a post-back or other action may automatically be performed by a client code module resident on the user's system. In particular, the SPS may have no interface at all, such that the SPS executes as a background task, daemon, driver, service, or other "hidden" system component that transparently performs post-backs and other actions in response to shipment preparation information obtained from a scanner or other input device. In other embodiments, the user may first be presented with the packing list of FIG. 3B. Then, when the user scans the bar code of the packing list, the Web browser is automatically directed (e.g., by an SPS operating as a daemon, service, background task or the like that receives the shipment preparation information from the scanner) to obtain a Web page that includes the shipping label of FIG. 3G, to access a Web based application configured to prepare the shipping label of FIG. 3G, or the like.

Although certain terms are used primarily herein, other terms could be used interchangeably to yield equivalent embodiments and examples. For example, it is well-known that equivalent terms in the shipping field and in other similar fields could be substituted for many of the terms used here. Specifically, the term "shipping label" can be used interchangeably with "ship label," "address label," "mailing label," etc. Likewise, the term "label" can be used interchangeably with "indicia," "marker," "tag," etc. Furthermore, the term "Uniform Resource Identifier" can be used interchangeably with "Uniform Resource Locator." In addition, terms may have alternate spellings which may or may not be explicitly mentioned, and all such variations of terms are intended to be included.

Example embodiments described herein provide applications, tools, data structures and other support to implement a shipment preparation system to be used for producing shipping labels and/or performing other shipment preparation activities. Other embodiments of the described techniques may be used for other purposes. For example, many applications could incorporate the technique of using a URI to cause a Web browser or other code module to initiate an action (e.g., loading of a file, output of a graphic, transmission of a data item, etc.) and perform a corresponding post back of information about performance of the action. Some example applications and/or uses include link tracking, report generation, address book management, contact management, etc. In general, these techniques are applicable to any application that could benefit from performing a designated action followed by a post back of information about the performed action.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps/blocks described with reference to any particular routine.

Figure 4:
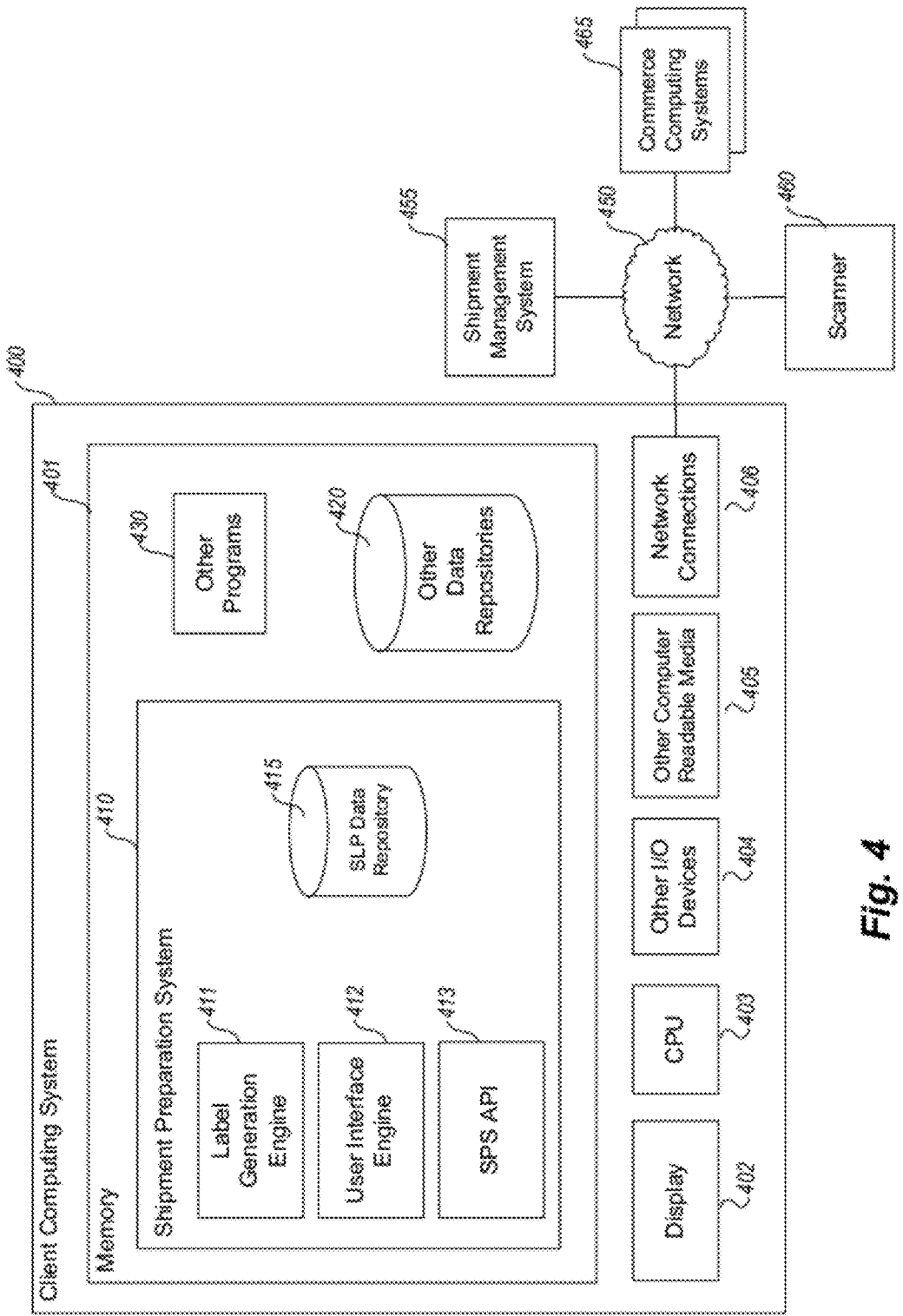
FIG. 4 is an example block diagram of an example computing system for practicing embodiments of a shipment preparation system.

FIG. 4 is an example block diagram of an example computing system for practicing embodiments of a shipment preparation system. Note that a general purpose or a special purpose computing system may be used to implement an SPS. Further, the SPS may be implemented in software, hardware, firmware, or in some combination to achieve the capabilities described herein. In some example embodiments, the SPS is a stand-alone executable. In other embodiments, the SPS is a Web-based application, hosted on a network server and executing in part on a client machine and in part on one or more server computing systems, possibly including web servers, API servers, and/or application servers.

The computing system 400 may comprise one or more server and/or client computing systems and may span distributed locations. In addition, each block shown may represent one or more such blocks as appropriate to a specific embodiment or may be combined with other blocks. Moreover, the various blocks of the SPS 410 may physically reside on one or more machines, which use standard (e.g., TCP/IP) or proprietary interprocess communication mechanisms to communicate with each other.

In the embodiment shown, computer system 400 comprises a computer memory ("memory") 401, a display 402, one or more Central Processing Units ("CPU") 403, Input/Output devices 404 (e.g., bar code scanner, RFID interrogator, keyboard, mouse, CRT or LCD display, etc.), other computer-readable media 405, and network connections 406. The SPS 410 is shown residing in memory 401. In other embodiments, some portion of the contents, some of, or all of the components of the SPS 410 may be stored on or transmitted over the other computer-readable media 405. The components of the SPS 410 preferably execute on one or more CPUs 403 and manage the production of shipping labels, as described herein. Other code or programs 430 (e.g., a Web browser) and potentially other data repositories, such as data repository 420, also reside in the memory 410, and preferably execute on one or more CPUs 403. Of note, one or more of the components in FIG. 4 may not be present in any specific implementation. For example, some embodiments embedded in other software many not provide means for user input or display.

In a typical embodiment, the SPS 410 includes a label generation engine 411, a user interface engine 412, a shipping preparation system application program interface ("SPS API") 413, and a shipping label production data repository 415. Other and/or different modules may be implemented. In addition, the SPS 410 may interact via a network 450 with a shipment management system 455, commerce computing systems 465 (e.g., online marketplaces, shipping carrier systems, etc.), and an accessible scanner 460. The scanner 460 may communicate via the network (e.g., wired or wireless) or it may communicate directly to the client computing system (e.g., wired or wireless). In other embodiments, the scanner may instead by another type of input device (e.g., RFID interrogator) or module (e.g., software data integrator/consumer) operable to read or otherwise consume shipment preparation information from a machine-readable data block. Also, the data repository 415 may be provided external to the SPS 410 as well, for example via a Web server or other access provider (not shown) executing on one of the other computing systems 460, accessible over the network 450. As noted, in other embodiments, the SPS 410 may be a Web-based application, in which the user interface is displayed in a Web browser (or similar rendering component), while the components of the SPS 410 are hosted on one or more computers at local or remote locations. In such an embodiment, a user may scan or otherwise read a machine-readable data block into a client computing system that then transmits the shipment preparation information to be processed by one or more a server-side shipment preparation components (e.g., a label generation component). In other embodiments, the label generation engine 411 may execute on the client computing system, or on one or more servers. The label generation engine may be an application that has a user interface or it may be accessible via a non visual API made available via HTTP or some other protocol.

The label generation engine 411 manages the generation of shipping labels. Generating shipping labels may include obtaining information about a particular shipment (e.g., a destination shipping address), and creating and/or managing data structures or other information used to facilitate, track, or otherwise represent the shipment. Generating shipping labels may also include determining and/or generating a representation of a shipping label (e.g., a bit map, a printer definition language file, an image file, etc.) and providing such a representation to some output device (e.g., a printer, a network interface, etc.). The label generation engine 411 may further provide information about generated shipping labels to other modules, such as the shipment management system 455.

The user interface engine 412 provides a view and a controller that facilitates user interaction with the SPS 410. The user interface engine 412 may, for example, provide an interactive graphical user interface such as the one described with reference to FIG. 3F. In other embodiments, such as when the SPS 410 is deployed as a server-based application, the user interface engine 412 may provide a Web interface that may be accessed by remote client computing systems executing Web browsers.

The SPS API 413 provides programmatic access to one or more functions of the SPS 410. For example, the SPS API 413 may provide an interface that provides one or more functions that may be called by one of the other programs 430 in order to produce a shipping label in an automated or semi-automated manner.

In addition, the API 413 may be in at least some embodiments invoked or otherwise accessed via remote entities, such as the shipment management system 455, the commerce computing system 465, and/or the scanner 460, to access various functions of the SPS 410. For example, the scanner 460 may transmit shipment preparation information to the SPS 410 via the API 413. In addition, the shipment management system 455 may transmit a packing list to the SPS 410 via the API 413. In general, the API 413 may enable local or remote computers and/or modules to interact with the SPS 410 using SOAP, HTTP, REST, or some other protocol.

The data repository 415 records information about shipments made via the SPS 410, as well as information related to the operation of the SPS 410 generally. Such information may include shipping records, user preferences, application settings (e.g., shipper return address, default carrier, etc.), account information (e.g., shipper accounts with one or more carriers), etc.

The SPS 410 may include other components that facilitate the preparation of a shipment. For example, the SPS 410 may include a component that generates and prints pick lists that include a list of items that are to be selected by a person and placed in a particular package. Also, the SPS 410 may include fewer components than those illustrated. For example, the SPS 410 may be a background task, daemon, driver, service, or other "hidden" system component that responds to shipment preparation information received from the scanner by automatically performing various shipment preparation activities, such as obtaining, generating, and/or printing a shipping label; obtaining, generating, and/or printing a pick list; communicating to obtain information for preparation of a shipment; communicating to transmit information about preparation of a shipment; and the like. In such an embodiment, the SPS 410 may not include all or some of one or more of the illustrated components, such as the user interface engine 412 (e.g., when any user interface capabilities are presented via a Web browser), the label generation engine (e.g., when the label is generated by a remote server), etc.

In an example embodiment, components/modules of the SPS 410 are implemented using standard programming techniques. For example, the SPS 410 may be implemented as a "native" executable running on the CPU 403, along with one or more static or dynamic libraries. In other embodiments, the SPS 410 may be implemented as instructions processed by virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an SPS implementation. Also, other steps/blocks could be implemented for each routine, and in different orders, and in different routines, yet still achieve the functions of the SPS.

In addition, programming interfaces to the data stored as part of the SPS 410 (e.g., in the data repository 415) can be available by standard means such as through C, C++, C#, and Java APIs; libraries for accessing files, databases, or other data repositories; through scripting languages such as XML; or through Web servers, FTP servers, or other types of servers providing access to stored data. The data repository 415 may be implemented as one or more database systems, file systems, or any other method known in the art for storing such information, or any combination of the above, including implementation using distributed computing techniques.

Also the example SPS 410 may be implemented in a distributed environment comprising multiple, even heterogeneous, computer systems and networks. For example, in one embodiment, the label generation engine 411, the user interface engine 412, the API 413, and the data repository 415 are all located in physically different computer systems. In another embodiment, various modules of the SPS 410 are hosted each on a separate server machine and may be remotely located from the tables which are stored in the SPS data repository 415. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of an SPS.

Furthermore, in some embodiments, some or all of the components of the SPS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, such as media 405, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
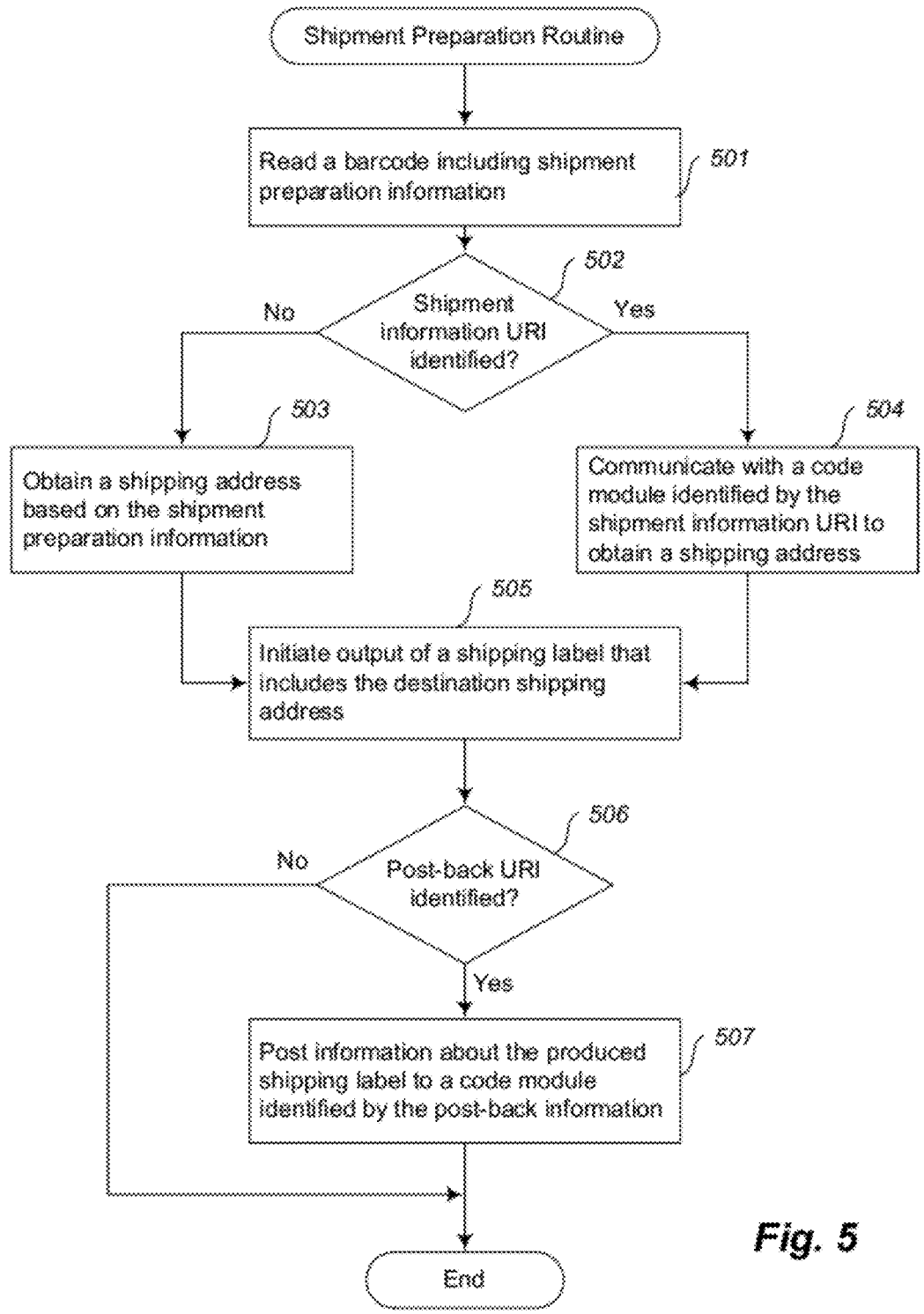
FIG. 5 is an example flow diagram of an example shipment preparation routine provided by an example embodiment of a shipment preparation system.

FIG. 5 is an example flow diagram of an example shipment preparation routine provided by an example embodiment of a shipment preparation system. The illustrated routine may be performed by the SPS 104, described with reference to FIGS. 1A-1B to facilitate shipment preparation, such as by producing the shipping label described with reference to FIG. 3G. The illustrated process demonstrates shipment preparation based on shipment preparation information obtained from a bar code in a packing list.

More specifically, at block 501, the routine receives shipment preparation information from a bar code. In one embodiment, the routine may receive the shipment preparation information by reading a bar code in a packing list with a bar code scanner or other input device. In other embodiments, the routine may receive shipment preparation information from other types of machine-readable data blocks, including RFID tags or the like, by using a suitable input device.

In block 502, the routine determines whether a shipment information URI is identified by the received shipment preparation information, and if not proceeds to block 503, else proceeds to block 504. The shipment information URI may be identified in various ways, including by being embedded or contained in the shipment preparation information (e.g., stored in a bar code) received in block 501, or more indirectly, such as via an identifier of a local file that includes the shipment information URI, via a URI that identifies a code module that provides the shipment information URI, or the like. Thus, block 502 may also include determining or obtaining the shipment information URI, as well as possibly one or more other URIs, such as a post-back URI (see block 506, below).

In block 503, the routine obtains a destination shipping address from the shipment preparation information. For example, the destination shipping address may be embedded directly in the shipment preparation information received in block 501, as illustrated in FIG. 3E.

In block 504, the routine communicates with a code module identified by the shipment information URI to obtain a destination shipping address. The code module may be, for example, an address management engine, as described with reference to FIG. 1A. The code module may reside in various places and execute under control of various parties. For example, the code module may execute on a remote computing system, such as a remote Web server executing an electronic commerce application (e.g., an online store, an auction Web site, etc.). In other embodiments, the code module may execute on the same client system that executes the routine, such as a local contact manager application.

Note that the operations described with respect to blocks 503 and 504 need not be exclusive of one another. For example, in some embodiments, the routine may obtain some shipment information (e.g., indications of one or more order items) directly from the shipment preparation information contained in a machine-readable data block and other shipment information (e.g., a destination address) from a code module identified by a URI. In other embodiments, the routine may obtain all shipment information directly from the shipment preparation information, and then confirm or verify that information by reference to a code module identified by a URI.

In block 505, the routine initiates output of a shipping label that includes the destination shipping address. Outputting the shipping label may include generating a digital representation of the shipping label (e.g., a bit map, an image file, etc.), printing the shipping label, sending or transmitting the shipping label (e.g., via email), recording the shipping label (e.g., in a data repository), etc.

In block 506, the routine determines whether a post-back URI is identified by the received shipment preparation information, and if not ends, else proceeds to block 507. The post-back URI may be identified in various ways, including by being embedded or contained in the shipment preparation information received in block 501, or more indirectly, as discussed with reference to block 502, above.

In block 507, the routine posts information about the produced shipping label to a code module identified by the post-back URI. As discussed above, post-back URI may identify a code module, such as the shipment information data engine 107 described with reference to FIG. 1A. In some embodiments, multiple post-back URIs that are used for different purposes may be identified by the shipment preparation information. For example, a first post-back URI may be used to provide information to one code module when the shipping label has been successfully produced, and a second post-back URI may be used to provide information to another code module when an error condition occurs, such as when the shipping label is not successfully produced (e.g., a printer error, a shipping account is invalid, an address cannot be verified, etc), when there is some problem fulfilling the shipment (e.g., one or more items are not in stock), or the like.

In addition, the shipment preparation information and/or the post-back URI may include or otherwise specify one or more fields, parameters, or other identifiers of data items that are to be reported to the code module, such as aspects of the shipment preparation process and/or the produced shipping label (e.g., a tracking number, a date, a shipping cost, etc.).

Furthermore, code modules may be identified in other ways. For example, the shipment preparation information may not include a URI or other identifier of a code module. Instead, the identity of a shipment information and/or post-back code module may be determined in other ways, such as implicitly, based on the identity of a server that provided some other portion of the shipment preparation information, such as the shipment information URI. In other embodiments, the identity of a shipment information and/or post-back code module may be recorded as a setting or preference of the SPS itself. Such a setting may be used as a default (e.g., when the shipment information does not identify a shipment information data engine) or an override (e.g., a shipment information data engine to use regardless of any shipment information data engine identified by the shipment preparation information).

Figure 6:
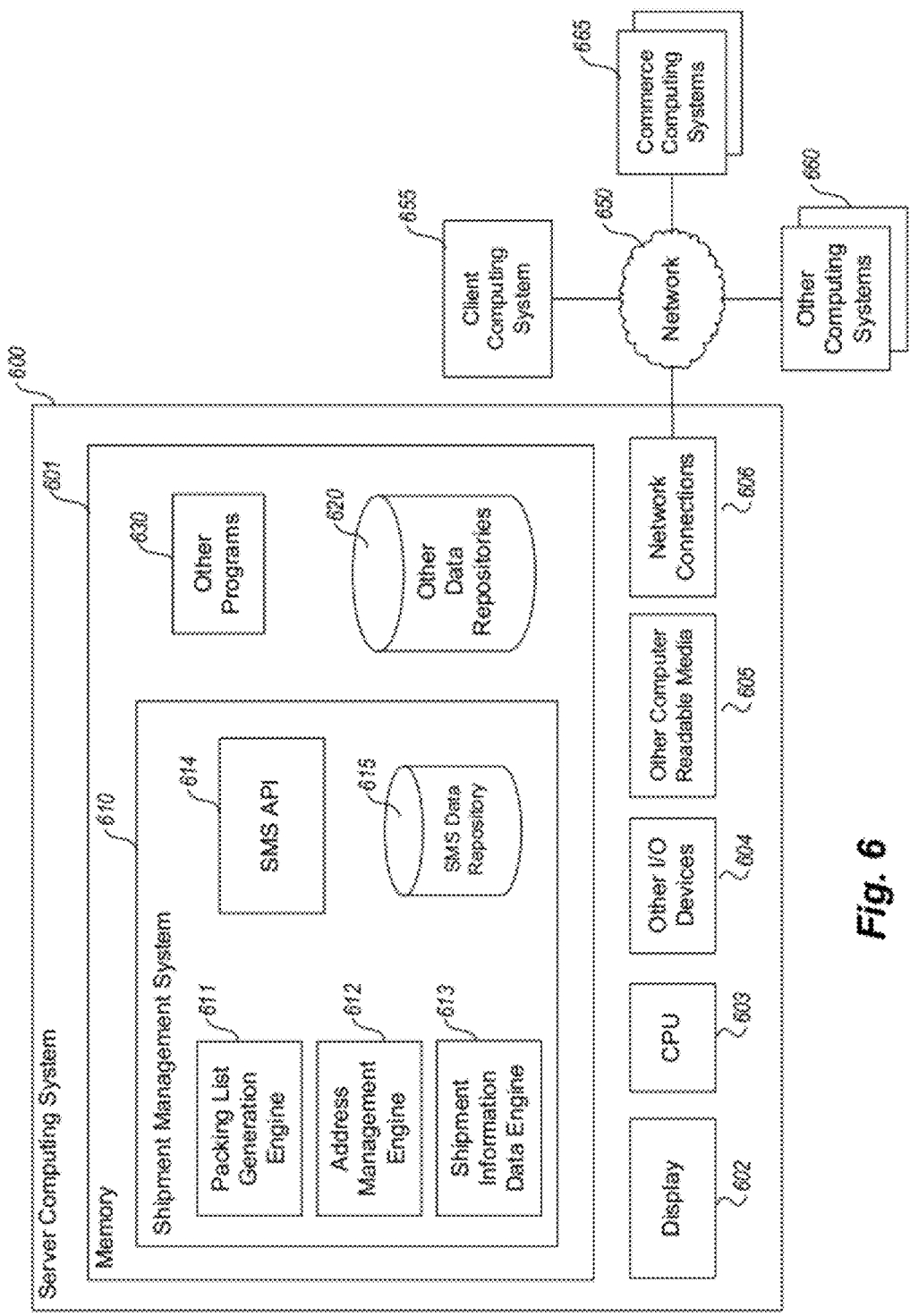
FIG. 6 is an example block diagram of a computing system for practicing embodiments of a shipment management system.

FIG. 6 is an example block diagram of a computing system for practicing embodiments of a shipment management system. Note that a general purpose or a special purpose computing system may be used to implement an SMS. Further, the SMS may be implemented in software, hardware, firmware, or in some combination to achieve the capabilities described herein.

The computing system 600 may comprise one or more server and/or client computing systems and may span distributed locations. In addition, each block shown may represent one or more such blocks as appropriate to a specific embodiment or may be combined with other blocks. Moreover, the various blocks of the SMS 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and network connections 606. The SMS 610 is shown residing in memory 601. In other embodiments, some portion of the contents, some of, or all of the components of the SMS 610 may be stored on or transmitted over the other computer-readable media 605. The components of the SMS 610 preferably execute on one or more CPUs 603 and manage the production of shipping labels, as described herein. Other code or programs 630 and potentially other data repositories, such as data repository 620, also reside in the memory 610, and preferably execute on one or more CPUs 603. Of note, one or more of the components in FIG. 6 may not be present in any specific implementation. For example, some embodiments embedded in other software many not provide means for user input or display.

In a typical embodiment, the SMS 610 includes a packing list generation engine 611, an address management engine 612, a shipment information data engine 613, a shipment management system application program interface ("SMS API") 614, and a shipment management system data repository 615. Other and/or different modules may be implemented. In addition, the SMS 610 may interact via a network 650 with a client computing system 655, commerce computing systems 665, and other computing systems 660. The client computing system 655 may, for example, execute an SPS as described with reference to FIG. 4. The SMS 610 may interact with an SPS on the client computing system 655 via a Web server executing as one of the other programs 630. Also, the SMS data repository 615 may be provided external to the SMS 610 as well, for example via a Web server or other access provider (not shown) executing on one of the other computing systems 660, accessible over the network 650.

The packing list generation engine 611, the address management engine 612, and the shipment information data engine 613 respectively correspond to the packing list generation engine 105, the address management engine 106, and the shipment information data engine 107, described with respect to FIG. 1A.

The SMS API 614 provides programmatic access to one or more functions of the SMS 610. For example, the SMS API 614 may provide an interface that provides one or more functions that may be called by one of the other programs 630 (e.g., a Web server) in order to initiate generation and/or transmission of a packing list. In this manner, the API 614 facilitates the development of third-party software, such as user interfaces, plug-ins, adapters (e.g., for integrating functions of the SMS 610 into Web applications), and the like. For example, the API 614 may facilitate the configuration of the SMS 610 as a Web-based shipment management system, in which a user interface is displayed in a Web browser (or similar rendering component), while other components of the SMS are hosted on one or more computers at a local or remote location.

In addition, the API 614 may be in at least some embodiments invoked or otherwise accessed via remote entities, such as the client computing system 655 and/or the commerce computing system 665, to access various functions of the SMS 610. For example, the client computing system 655 executing a SPS may obtain from and/or provide to the SMS 610 information about a shipment via the API 614. In addition, the commerce computing system 665 may provide order information to the SMS 610 via the API 614.

As discussed with reference to the SPS of FIG. 4, the SMS 610 may similarly be implemented in various ways and/or using various known or proprietary techniques. In particular, the SMS 610 may be implemented in hardware, software, and/or firmware. Software portions of the SMS 610 may be implemented using one or more programming languages and associated tools (e.g., compilers, interpreters, linkers, etc.) to generate code portions (e.g., instruction sequences) that may be processed by hardware components (e.g., a CPU) and/or software components (e.g., a virtual machine). In addition, the SMS 610 may be decomposed, if at all, using various techniques, including client-server architectures, N-tier architectures, Web Services (e.g., SOAP), classes, libraries, archives, etc.

Figure 7:
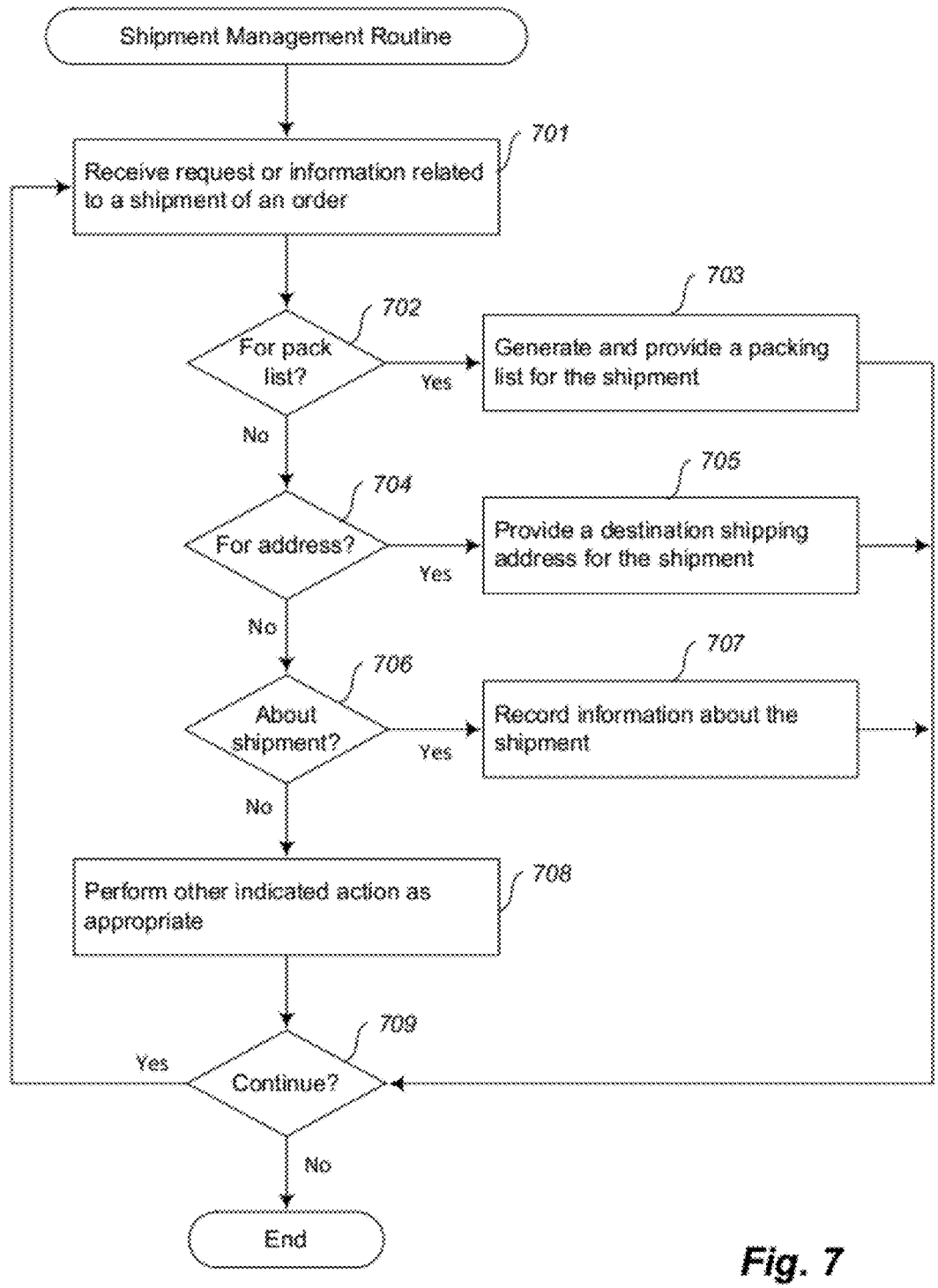
FIG. 7 is an example flow diagram of an example shipment management routine provided by an example embodiment of a shipment management system.

FIG. 7 is an example flow diagram of an example shipment management routine provided by an example embodiment of a Shipment Management System. The illustrated routine may be performed by the SMS 102, described with reference to FIG. 1A to provide shipment management functionality to one or more SPSs, such as packing list generation, address management, and/or shipment tracking. In blocks 701-709, the routine performs a loop in which it repeatedly processes received requests or information related to shipments.

More specifically, at block 701, the routine receives a request or information related to a shipment. The request or information may be received from, for example, a Web browser or an SPS. The shipment may be identified in various ways, such as by an order identifier, a recipient identifier, an item identifier, etc. In some embodiments, the routine may execute one or more access control techniques at this point, such as checking whether the received request or information was accompanied by one or more tokens (e.g., cookie, password, passkey, username, etc.) configured to enable access to the functionality provided by the routine.

In block 702, the routine determines whether a request for a shipping URI was received, and if so, proceeds to block 703, else proceeds to block 704. In block 703, the routine generates and provides packing list for a shipment that corresponds to the request. Generating the packing list may include dynamically generating a packing list that includes shipment preparation information in a bar code or other machine-readable data block, the shipment preparation information based on various factors, such as the identity of the party making the request, the identity of the recipient of the item, a shipment identifier, the capabilities of a particular SPS, etc. A generated packing list may be provided (e.g., transmitted, sent, forwarded, etc.) to an SPS in order to cause the SPS to facilitate preparation of the shipment in accordance with shipment preparation information included in a bar code of the packing list. In some embodiments, generated packing list may be provided to other components of the SMS, such as a data repository, such that the generated shipping URIs may be utilized at a later time. The routine then proceeds to block 709.

In block 704, the routine determines whether a request for a destination shipping address was received, and if so, proceeds to block 705, else proceeds to block 706. In block 705, the routine provides a destination shipping address for the shipment that corresponds to the request. The destination shipping address may be obtained by the routine from, for example, the SMS data repository 615 of FIG. 6, based on an identifier (e.g., an order identifier) provided along with the request. In some embodiments, the destination shipping address may be formatted in accordance with an address format specification (e.g., an XML specification for mailing addresses). The routine then proceeds to block 709.

In block 706, the routine determines whether information about a shipment was received, and if so, proceeds to block 707, else proceeds to block 708. In block 707, the routine records information about the shipment. Recording information about the shipment may include storing one or more data items (e.g., a tracking number, a status code, an error message, a parcel weight, etc.) in the SMS data repository 615 of FIG. 6. The routine then proceeds to block 709.

In block 708, the routine performs other indicated actions as appropriate. Other actions may include, for example, providing information about the status of a shipment (e.g., whether and/or when the shipment was shipped or received), deleting information about one or more shipments, etc.

In block 709, the routine determines whether to continue, and if so, continues the loop of 701-709, else ends.

The above-described techniques can be used during other phases of a typical item shipment process as well. For example, as noted with respect to FIG. 3G, a machine-readable data block can be used as part of a receipt scan process performed by the recipient/buyer of a shipment. In such an embodiment, a recipient scans a machine-readable data block (e.g., bar code 343 of FIG. 3G) that is part of a received package, such as by using a smart phone that includes bar code reader software. Information contained in the machine-readable data block then causes various actions to occur on the recipient's smart phone. For example, the smart phone may display a feedback form that can be used by the recipient to describe the condition of the received goods, provide an image of a damaged shipment, provide customer satisfaction information, or the like. The smart phone may also transmit (e.g., by sending an SMS, making an HTTP request) information (with or without further interaction from the user) informing a remote code module that the shipment has been received. Various further local and/or remote actions can be taken in response to a recipient scan, such as a transfer/registration of ownership; an initiation of a warranty, return, or exchange period; an initiation of a refund/exchange process (e.g., generation of a return shipping label, notification of a shipping carrier to pick up a returned item); an initiation of a feedback process (e.g., posting to a review/feedback Web site); an initiation of a social networking operation (e.g., updating a social network page, transmitting a status update); or the like.

As described further below, in some embodiments, a syntax and semantics for shipping uniform resource identifiers is defined. A shipping uniform resource identifier ("URI") may be generated by an SMS and embedded within a machine-readable data block such as a bar code. The shipping URI can be used to specify actions that that are to be taken by the SPS to perform a particular item shipment. A shipping URI includes a scheme name that identifies a shipping protocol and that is configured to cause Web browsers or other applications to execute an SPS to perform activities such as to produce a shipping label. A shipping URI also includes scheme data that is provided by the SMS to the SPS and that specifies one or more aspects of a particular item shipment. The scheme data may include, for example, a destination shipping address that is to be included in a shipping label for a particular shipment or may include an identifier (e.g., a URI or link) that may be used to determine a destination shipping address or other shipping characteristics. The scheme data may also include an identifier (e.g., another URI) of a code module (e.g., of a Web server) that is configured to store information about shipments, such that the SPS can provide information about the item shipment to the code module. Alternatively, a single identifier may be used to obtain shipment label information such as an address associated with a particular shipment and to provide information about the item shipment. For example, the SPS may provide information regarding the printing of a shipping label, a tracking number associated with the shipment, etc. By automatically providing information about the item shipment to the code module, the information may then be made available to other systems and/or users, such as the intended recipient of the item shipment, so the recipient can be notified or otherwise learn that the item has been shipped. In this manner, a shipping URI facilitates the interoperation of disparate computing systems to efficiently perform item shipments. Techniques related to shipping URIs are described further in U.S. Pat. No. 7,409,353, issued Aug. 5, 2008, entitled "Methods and Systems for Producing Shipping Labels", and U.S. Pat. No. 7,624,025, issued Nov. 24, 2009, entitled "Methods and Systems for Supporting the Production of Shipping Labels," all of which are incorporated in their entireties herein by reference.

In one embodiment, URI-based shipping protocol is provided. A shipping protocol defines a syntax for well-formed shipping URIs and the corresponding item shipment actions (e.g., shipping label generation and/or output) taken by a compliant SPS in response to a well-formed shipping URI. One example syntax for a shipping URI is:

```
[shippingURI]     :=   ship://[property_list]
[property_list]   :=   [property] |
                       [property]?[property_list]
[property]        :=   [property_name]=[property_value]
[property_name]   :=   GETURI |
                       POSTURI |
                       ADDR |
                       TRANSFORM |
                       POST_METHOD |
                       POSTBACK_FAIL
[property_value]  :=   [encoded_string]
```

In this example, a shipping URI comprises the text string "ship," followed by the text string "://" followed by a list of properties. In the illustrated example, the text string "ship" identifies the described shipping protocol. In other embodiments, other identifiers may be used, such as "shipto," "slpp" ("Shipping Label Production Protocol"), etc. A list of properties is one or more properties, separated by the "?" character. Each property is a key-value pair comprising a property name, followed by the "=" character, followed by a property value. A property may specify an action to be taken by the SPS and/or a property of a shipping label that is to be produced. Allowed property names in the example protocol include GETURI, POSTURI, ADDR, TRANSFORM, POST_METHOD, and POSTBACK_FAIL. Other protocols may include a greater or lesser number of properties and/or different property names. A property value is any URI encoded string.

Table 1, below, describes the semantics and/or purpose of each of the properties defined by an example shipping protocol.

TABLE 1

| Property | Example Semantics/Purpose |
| --- | --- |
| GETURI=[URI] | To specify a URI which may be used by an SPS to obtain a destination shipping address from a code module identified by the URI and/or to provide a location of a module to be used by an SPS to provide post-back information. |
| POSTURI=[URI] | To specify a URI which may be used by an SPS to provide information about an item shipment to a code module identified by the URI. |
| ADDR=[address] | To specify a destination shipping address, such as by an XML string or plain text. |
| TRANSFORM=[URI] | To specify a URI which identifies a style sheet which may be used to transform a destination shipping address into a printable representation. |
| POST_METHOD=[METHOD] | To specify an HTTP method (e.g., GET or POST) to use when obtaining a destination shipping address and/or providing information about an item shipment. |
| POSTBACK_FAIL=[URI] | To specify a URI which may be used by an SPS to provide information about an error condition related to an item shipment to a code module identified by the URI. |

Table 2, below, provides examples for each of the properties defined by an example URI-based shipping protocol. Note that for readability, the examples of Table 2 have in some cases been broken across multiple lines. In typical embodiments, the illustrated properties would not include newline characters or be broken over several lines, as illustrated.

TABLE 2

| Property | Example(s) |
| --- | --- |
| GETURI=[URI] | GETURI=http://a.com/order-lookup?<br>OrderNum=1234&AccessToken=abc1 |
| POSTURI=[URI] | POSTURI=http://a.com/ship-post?<br>OrderNum=1234&AccessToken=abc1&<br>TrackingNum=%TrackingNum%&<br>ShippingCost=%ShippingCost%&<br>ShipmentDate=%ShipmentDate%&<br>Weight=%Weight%&<br>Carrier=%Carrier% |
| ADDR=[address] | ADDR=<address><br>    <recipient>Mr. Buyer</recipient><br>    <street>123 Easy St.</street><br>    <city>Chicago</city><br>    <state>IL</state><br>    <zip>60137</zip><br></address> |
| TRANSFORM=[URI] | TRANSFORM=http://a.com/Transform.xsl<br>TRANSFORM=file:///Transform.xsl |
| POST_METHOD=[METHOD] | POSTMETHOD=HTTP_POST<br>POSTMETHOD=HTTP_GET<br>POSTMETHOD=FTP_PUT |
| POSTBACK_FAIL=[URI] | POSTBACK_FAIL=http://a.com/postfailed?<br>OrderNum=1234&<br>ErrorMessage=%ErrorMessage% |

In the example shipping protocol, property values may include one or more fields that each refer to aspects of an item shipment and/or a produced shipping label. These fields are specified as text strings surrounded by the "%" character. In other embodiments, other delimiters may be utilized (e.g., "$", "?", "!", etc.) Table 3, below, describes various fields and their semantics. Other fields and/or semantics can be similarly supported.

TABLE 3

| Field | Example Semantics |
| --- | --- |
| %TrackingNum% | A tracking number associated with the shipment (e.g., as provided by a carrier service) |
| %ShippingCost% | The cost of the shipment |
| %ShipmentDate% | The date that the item was shipped (e.g., provided to a carrier service) |
| %Carrier% | A name or other identifier of a carrier for the shipment (e.g., United Parcel Service, Federal Express, U.S. Postal Service, etc.) |
| %CarrierService% | A type of service used to ship the item (e.g., next day, weekend delivery, etc.) |
| %Weight% | The weight of the shipment |
| %Dimensions% | One or more dimensions of a parcel, envelope, or other packing materials used to ship the item |
| %ErrorMsg% | An error message or code associated with the item shipment (e.g., that the label did not print correctly, that a destination shipping address could not be verified) |
| %LabelPrintDate% | The date and/or time on which the shipping label was printed |
| %ShipmentStatus% | The status of the shipment (e.g., label printed, awaiting pickup, picked up, etc.) |
| %TransitTime% | The real or estimated time in transit for the shipment |

In a typical embodiment, an SPS will replace each field in a given property value of a shipping URI (i.e., substitute a given field) with the appropriate data item from the corresponding item shipment and/or shipping label. For example, if a TrackingNum field occurs in a POSTURI, the SPS will replace the string "% TrackingNum %" with an actual tracking number from the corresponding item shipment and/or shipping label. This string replacement will typically occur prior to the use of the POSTURI in order to provide information to a code module identified by the POSTURI about the corresponding item shipment.

In one embodiment an XML-based shipping protocol is provided. A shipping protocol defines a syntax for well-formed XML shipment preparation information blocks and the corresponding item shipment actions (e.g., shipping label generation and/or output) taken by a compliant SPS in response to a well-formed shipping preparation information block. Example XML-based shipping information blocks are illustrated in FIGS. 3C-3E. Various details of the shipping protocol described with respect to Tables 1-3, above, can be applied equally to an XML-based shipping protocol. For example, XML elements can be defined that have syntax and/or semantics that are equivalent to the URI properties described with reference to Tables 1 and 2. In addition, XML-based shipment preparation information blocks may include the property value fields (or similar constructs) described with reference to Table 3, for purposes of field substitution or the like.

All of the above U.S. patents, U.S. patent application publications, U.S. patent applications, foreign patents, foreign patent applications and non-patent publications referred to in this specification and/or listed in the Application Data Sheet, including but not limited to U.S. Pat. No. 7,409,353, issued Aug. 5, 2008, entitled "Methods and Systems for Producing Shipping Labels;" U.S. Pat. No. 7,624,025, issued Nov. 24, 2009, entitled "Methods and Systems for Supporting the Production of Shipping Labels;" U.S. Patent Application No. 61/019,208, filed Jan. 4, 2008, entitled "Methods and Systems for Supporting the Production of Shipping Labels;" U.S. patent application Ser. No. 12/169,509, filed Jul. 8, 2008, entitled "Methods and Systems for Producing Shipping Labels;" and U.S. patent application Ser. No. 12/347,660, filed Dec. 31, 2008, entitled "Methods and Systems for Supporting the Production of Shipping Labels" are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for facilitating shipment preparation discussed herein are applicable to other architectures other than an electronic commerce order management architecture. As noted, the described techniques may be used for any carrier/mail communication, such as direct mail operations, mail merges, etc. Also, the methods and systems discussed herein are applicable to differing shipping and/or networking protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a shipment preparation computing system, comprising:
   facilitating preparation of a shipment of an order, by:
      receiving shipment preparation information from a bar code in a packing list, the shipment preparation information including a network resource identifier that identifies a code module that is remote and separate from the shipment preparation computing system, wherein the network resource identifier identifies a shipping protocol and is configured to cause the shipment preparation computing system to execute a shipment preparation module and to provide a portion of the network resource identifier to the shipment preparation module, the portion of the network resource identifier identifying shipment information and post-back information;
      communicating, based on the shipment information identified by the network resource identifier from the received shipment preparation information from the bar code, with the remote code module to obtain information for the preparation of the shipment of the order; and
      communicating, based on the post-back information identified by the network resource identifier from the received shipment preparation information from the bar code, with the remote code module to cause the remote code module to persistently store in a data repository status information about the preparation of the shipment of the order; and
   initiating the shipment of the order based on the shipment preparation information received from the bar code in the packing list.

2. The method of claim 1 wherein communicating with the remote code module to obtain information for the preparation of the shipment of the order includes receiving from the remote code module shipment information that includes an indication of at least one of: a destination shipping address; an order number; information about one or more items in the order, including at least one of a quantity, a part number, a stock-keeping unit, a color, a size, a weight, and/or a price; a preferred shipping method; a package type; a package size; and/or a shipping carrier.

3. The method of claim 1 wherein the remote code module is operated by an entity that is a shipping carrier and that does not operate the shipment preparation computing system, and wherein communicating with the remote code module to cause the remote code module to persistently store in the data repository status information about the preparation of the shipment of order includes transmitting to the shipping carrier information about the preparation of the shipment, the transmitted information including a shipment status including at least one of: the shipment being ready for pickup by the shipping carrier, the shipment not being ready for pickup by the shipping carrier, a vehicle type, and/or an amount of space needed in a vehicle.

4. The method of claim 1 wherein initiating the shipment of the order includes printing a shipping label that includes at least some of the information obtained from the remote code module.

5. The method of claim 1, further comprising:
   posting information about the preparation of the shipment of the order to the remote code module, based at least in part on the post-back information.

6. The method of claim 1 wherein the shipment preparation information from the bar code in the packing list specifies one or more item shipment actions defined by a shipping protocol, and further comprising:
   performing the specified one or more item shipment actions defined by the shipping protocol.

7. The method of claim 1 wherein communicating with the remote code module to cause the remote code module to persistently store in a data repository status information about the preparation of the shipment of the order includes causing the remote code module to store the status information in a database communicatively coupled to the remote code module.

8. A computer-readable storage medium storing a computer program that, when executed, causes a shipment preparation computing system to perform a method comprising:
   facilitating preparation of a shipment of an order, by:
      receiving shipment preparation information from a machine-readable data block in a packing list, the shipment preparation information including a network resource identifier that identifies a code module that is remote and separate from the shipment preparation computing system, wherein the network resource identifier identifies a shipping protocol and is configured to cause the shipment preparation computing system to execute a shipment preparation module and to provide a portion of the network resource identifier to the shipment preparation module, the portion of the network resource identifier identifying shipment information and post-back information;
      communicating, based on the shipment information identified by the network resource identifier from the received shipment preparation information from the machine-readable data block, with the remote code module to obtain information for the preparation of the shipment of the order;
      communicating, based on the post-back information identified by the network resource identifier from the received shipment preparation information from the machine-readable data block, with the remote code module to cause the remote code module to persistently store in a data repository status information about the preparation of the shipment of the order; and
   initiating the shipment of the order based on the shipment preparation information received from the machine-readable data block in the packing list.

9. The computer-readable medium of claim 8 wherein the machine-readable data block is a two-dimensional bar code in the packing list, and wherein receiving the shipment preparation information from the machine-readable data block includes scanning the bar code to obtain the shipment preparation information.

10. The computer-readable medium of claim 8 wherein the shipment preparation information identifies the remote code module by including a uniform resource identifier that identifies the remote code module, and wherein communicating with the remote code module includes communicating with the remote code module based on a protocol and a network address included in the uniform resource identifier.

11. The computer-readable medium of claim 8 wherein the shipment preparation information includes indications of one or more items for the order, and wherein initiating the shipment of the order based on the shipment preparation information includes causing a person to prepare a package by providing instructions to the person that specify one or more items of the order to be placed in the package.

12. A shipment preparation computing system, comprising:
  a processor; and
  a memory, communicatively coupled to the processor, wherein the computing system is configured to perform a method comprising:
    receiving shipment preparation information from a machine-readable data block read by a scanning device, the shipment preparation information including a network resource identifier that identifies a code module that is remote and separate from the shipment preparation computing system, wherein the network resource identifier identifies a shipping protocol and is configured to cause the shipment preparation computing system to execute a shipment preparation module and to provide a portion of the network resource identifier to the shipment preparation module, the portion of the network resource identifier identifying shipment information and post-back information;
    communicating, based on the shipment information identified by the network resource identifier from the received shipment preparation information from the machine-readable data block, with the remote code module to obtain information for the preparation of the shipment of an order; and
    communicating, based on the post-back information identified by the network resource identifier from the received shipment preparation information from the machine-readable data block, to cause the remote code module to persistently store in a data repository status information about the preparation of the shipment of the order.

13. The system of claim 12 wherein the machine-readable data block does not include any human-readable information that describes the order.

14. The system of claim 12 wherein facilitating the preparation of the shipment of the order includes initiating printing of a shipping label that includes at least some of the information obtained from the remote code module.

15. The system of claim 12 wherein the shipment preparation information identifies the remote code module by indicating a network-accessible file that includes an indication of the remote code module.

16. The system of claim 12 wherein the shipment preparation information identifies the remote code module by indicating a code module configured to provide an indication of the remote code module.

17. The system of claim 12 wherein the machine-readable data block is displayed as part of a packing list.

18. The system of claim 12 wherein the shipment preparation information includes indications of one or more items for the order.

19. The system of claim 12 wherein the computing system is further configured to perform a method comprising:
  posting information about the preparation of the shipment of the order to the remote code module, based at least in part on the post-back information.

20. The system of claim 12 wherein the shipment preparation information specifies one or more item shipment actions defined by a shipping protocol and wherein the computing system is further configured to perform a method comprising:
  performing the specified one or more item shipment actions defined by the shipping protocol.

* * * * *